United States Patent
Hamilton et al.

(10) Patent No.: US 12,061,739 B2
(45) Date of Patent: Aug. 13, 2024

(54) METHOD AND SYSTEM FOR THE GENERATION AND MANAGEMENT OF TACTILE COMMANDS FOR TACTILE SENSATION

(71) Applicant: Emerge Now Inc., Marina del Rey, CA (US)

(72) Inventors: James D. Hamilton, Marina del Rey, CA (US); Naveen Anand Gunalan, Marina del Rey, CA (US); Adam Elhadad, Marina del Rey, CA (US); Nathan E. Brummel, Marina del Rey, CA (US); Dustin Delmer, Marina del Rey, CA (US); Stephen Hodgson, Marina del Rey, CA (US)

(73) Assignee: Emerge Now Inc., Marina del Rey, CA (US)

( * ) Notice: Subject to any disclaimer, the term of this patent is extended or adjusted under 35 U.S.C. 154(b) by 0 days.

(21) Appl. No.: 17/568,592

(22) Filed: Jan. 4, 2022

(65) Prior Publication Data
US 2022/0129077 A1    Apr. 28, 2022

Related U.S. Application Data

(63) Continuation of application No. 17/346,912, filed on Jun. 14, 2021, now Pat. No. 11,249,553.

(60) Provisional application No. 63/038,236, filed on Jun. 12, 2020.

(51) Int. Cl.
*G06F 3/01*   (2006.01)
*G06T 17/20*  (2006.01)

(52) U.S. Cl.
CPC .............. *G06F 3/016* (2013.01); *G06F 3/011* (2013.01); *G06T 17/20* (2013.01)

(58) Field of Classification Search
None
See application file for complete search history.

(56) References Cited

U.S. PATENT DOCUMENTS

| | | |
|---|---|---|
| 9,898,864 B2 | 2/2018 | Shapira et al. |
| 2012/0229401 A1 | 9/2012 | Birnbaum et al. |
| 2015/0192995 A1 | 7/2015 | Subramanian et al. |
| 2017/0212589 A1 | 7/2017 | Domenikos et al. |
| 2017/0220111 A1 | 8/2017 | Nakamura et al. |
| 2017/0220112 A1 | 8/2017 | Nakamura et al. |

(Continued)

FOREIGN PATENT DOCUMENTS

WO    2013160561 A1    10/2013

OTHER PUBLICATIONS

"Kim et al, A Tactile Glove Design and Authoring System for Immersive Media" (Year: 2010).*
Sand et al., "Head-Mounted Display with Mid-Air Tactile Feedback" (Year: 2015).*

(Continued)

*Primary Examiner* — Hilina K Demeter
(74) *Attorney, Agent, or Firm* — Jeffrey Schox; Diana Lin

(57) ABSTRACT

A system for the generation and management of tactile sensation includes a computing subsystem. A method for the generation and management of tactile sensation includes receiving a set of inputs and processing the set of inputs. Additionally or alternatively, the method 200 can include: communicating tactile commands to a tactile interface system; operating the tactile interface system based on the tactile commands; and/or performing any other suitable processes.

20 Claims, 17 Drawing Sheets

(56) References Cited

U.S. PATENT DOCUMENTS

| | | | |
|---|---|---|---|
| 2018/0067557 A1 | 3/2018 | Robert et al. | |
| 2018/0350203 A1* | 12/2018 | Cruz-Hernandez | A63F 13/28 |
| 2018/0373335 A1* | 12/2018 | Seiler | G06F 3/002 |
| 2019/0204917 A1* | 7/2019 | Rihn | G06F 3/013 |
| 2020/0218338 A1* | 7/2020 | Lee | G06F 3/013 |
| 2020/0218354 A1* | 7/2020 | Beattie | G06T 7/41 |
| 2021/0089126 A1* | 3/2021 | Nickerson | G06V 40/113 |
| 2021/0286432 A1* | 9/2021 | Ishikawa | G08B 6/00 |
| 2023/0020835 A1 | 1/2023 | Gunalan et al. | |

OTHER PUBLICATIONS

Inoue et al., "Active Touch Perception Produced by Airborne Ultrasonic Haptic Hologram", (Year: 2015).*

Korres et al., "Haptogram: Ultrasonic Point-Cloud Tactile Stimulation", (Year: 2016).*

Long et al., "Rendering Volumetric Haptic Shapes in Mid-Air using Ultrasound", (Year: 2014).*

Martinez et al., "Mid-Air Haptic Algorithms for Rendering 3D Shapes", (Year: 2019).*

Matsubauashi et al., "Direct Finger Manipulation of 3D Object Image with Ultrasound Haptic Feedback", (Year: 2019).*

Kim et al., "Tactile Rendering of 3D Features on Touch Surfaces" (Year: 2013).*

Otaduy et al., "Sensation Preserving Simplification for Haptic Rendering" (Year: 2005).*

Watanabe, Toshio, et al., "A Method for Controlling Tactile Sensation of Surface Roughness Using Ultrasonic Vibration", IEEE, 1995.

* cited by examiner

METHOD AND SYSTEM FOR THE GENERATION AND MANAGEMENT OF TACTILE COMMANDS FOR TACTILE SENSATION

CROSS-REFERENCE TO RELATED APPLICATIONS

This application is a continuation of U.S. application Ser. No. 17/346,912, filed 14 Jun. 2021, which claims the benefit of U.S. Provisional Application Ser. No. 63/038,236, filed 12 Jun. 2020, each of which is incorporated in its entirety by this reference.

TECHNICAL FIELD

This invention relates generally to the immersive computing field, and more specifically to a new and useful system and method for generating and managing tactile commands for tactile sensation in the immersive computing field.

BACKGROUND

The demand to add immersive features to virtual reality and augmented reality systems has been strong in recent years, and the applications in which such immersive systems can be used (e.g., gaming, remote task performance, video conferencing, etc.) have consequently expanded.

Most conventional systems and methods for creating immersive virtual environments, however, lack tactile effects, and those that do conventionally require wearables or other devices which are limited in that they restrict or impede motion, are uncomfortable, or otherwise unsuitably configured. Further, integrating tactile effects into an immersive environment with other forms of sensation and content (e.g., visual, audio, etc.), along with dynamically responding to user actions, is extremely complex.

The inventors have created an improved and useful system and method for generating and managing tactile commands for tactile sensation, which is described below.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
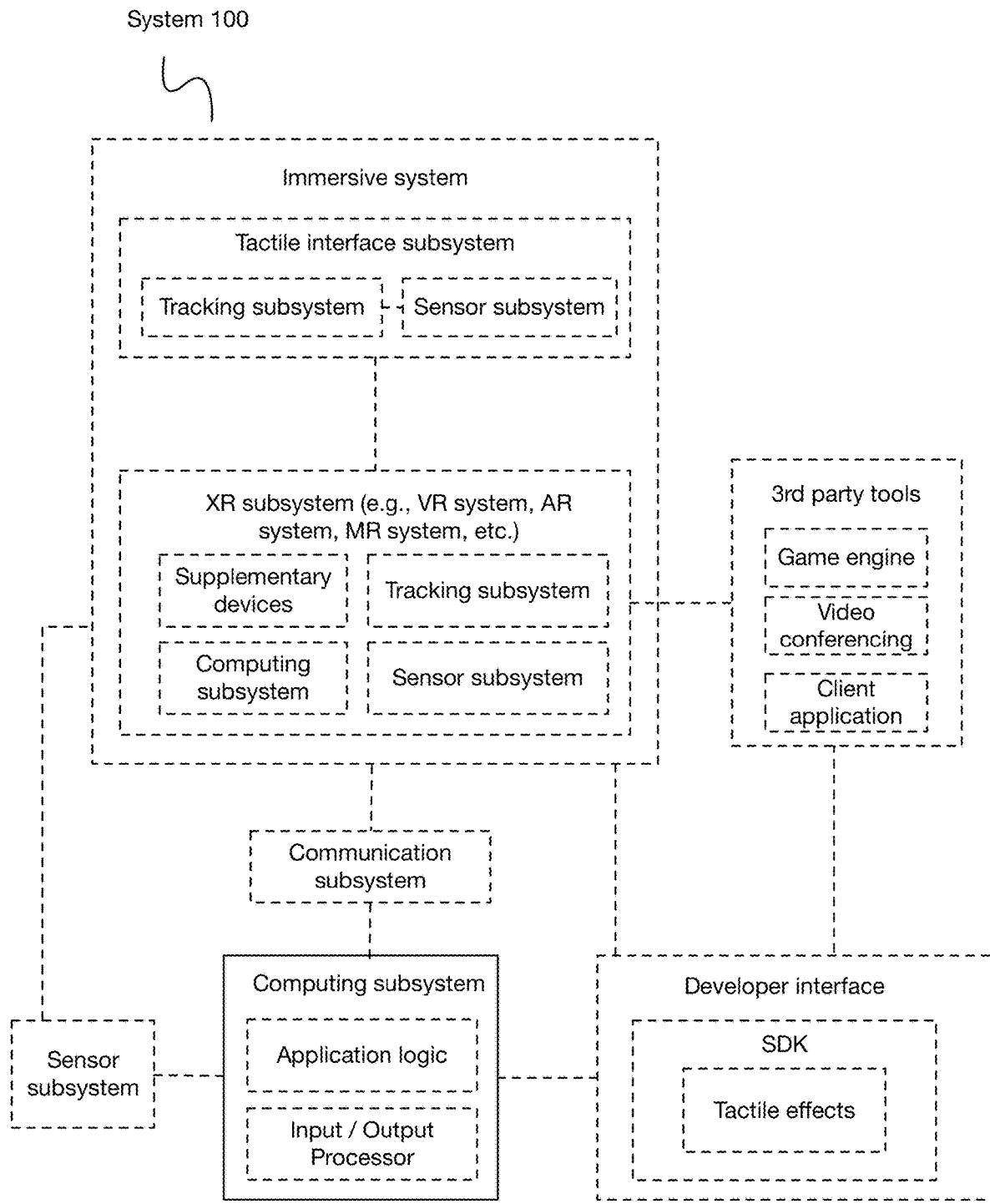
FIG. 1 is a schematic of a system for generating and managing tactile commands.

As shown in FIG. 1, a system 100 for the generation and management of tactile (equivalently referred to herein as haptic) sensation includes a computing subsystem, wherein the computing subsystem can optionally include and/or interface with application logic and an input/output processor. The system 100 can optionally additionally or alternatively include and/or interface with a developer interface (e.g., a software development kit [SDK], accompanying hardware such as a monitor/display for creating applications, accompanying software, etc.). Additionally or alternatively, the system 100 can include and/or interface with any or all of: one or more $3^{rd}$ party tools (e.g., game engine, video conferencing tools, client application, etc.), such as through the developer interface; a communication subsystem; an immersive computing subsystem including a tactile interface subsystem (equivalently referred to herein as a tactile device and/or tactile stimulation device and/or a tactile interface system) and/or an XR system and/or any other suitable systems; one or more tracking subsystems; one or more sensor subsystems; a control subsystem (e.g., controller onboard the tactile device); and/or any other suitable components.

Further additionally or alternatively, the system 100 can include any or all of the components, embodiments, and examples as described in any or all of: U.S. application Ser. No. 15/662,159, filed 27 Jul. 2017, U.S. application Ser. No. 17/296,445, filed 24 May 2021, and U.S. application Ser. No. 17/189,828, filed 2 Mar. 2021, each of which is incorporated herein in its entirety by this reference.

The system 100 is preferably used in accordance with the method 200 described below, but can additionally or alternatively be used in performing any other suitable methods or processes in any suitable use cases.

Figure 2:
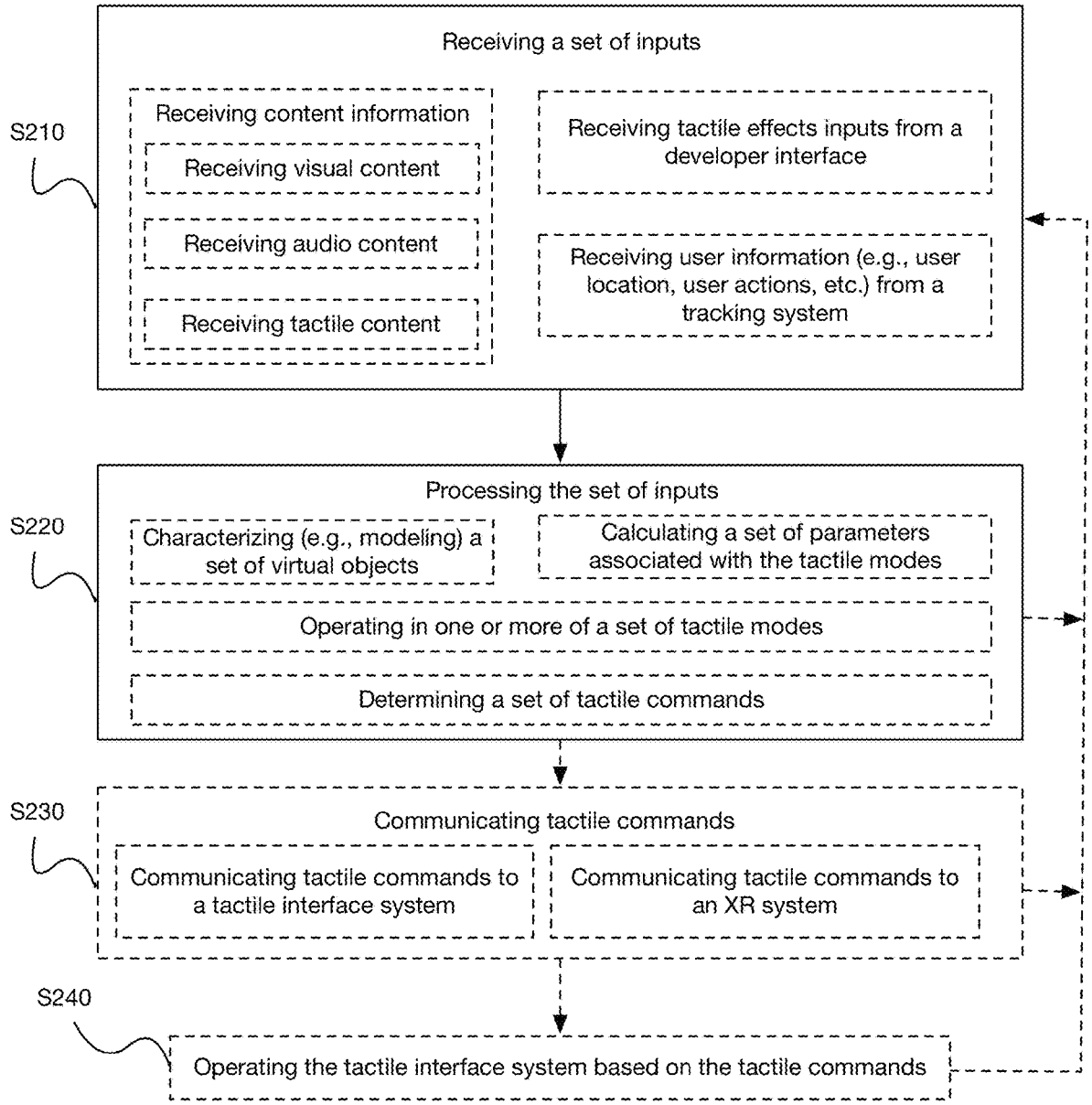
FIG. 2 is a schematic of a method for generating and managing tactile commands.

As shown in FIG. 2, the method 200 includes receiving a set of inputs S210; and processing the set of inputs S220. Additionally or alternatively, the method 200 can include: communicating tactile commands to a tactile interface system S230; operating the tactile interface system based on the tactile commands S240; and/or performing any other suitable processes.

Additionally or alternatively, the method 200 can include any or all of the processes, embodiments, and/or examples described in any or all of: U.S. application Ser. No. 15/662, 159, filed 27 Jul. 2017, U.S. application Ser. No. 17/296,445, filed 24 May 2021, and U.S. application Ser. No. 17/189, 828, filed 2 Mar. 2021, each of which is incorporated herein in its entirety by this reference, or any other suitable processes performed in any suitable order. The method 200 can be performed with a system as described above and/or any other suitable system.

The method 200 is preferably performed with the system 100, but can additionally or alternatively be performed with any other suitable systems or system components.

2. Benefits

The system and method for generating and managing tactile sensation can confer several benefits over current systems and methods.

In a first set of variations, the system and/or method confers the benefit of enabling users to receive tactile sensation in combination with other forms of sensory stimulation, such as visual and/or audio stimulation. In specific examples, for instance, the system and method enable a user to detect, feel, and manipulate virtual objects based on tactile features attributed to and dynamically updated with the tactile content.

In a second set of variations, additional or alternative to the first, the system and/or method confers the benefit of enabling developers to easily and intuitively apply tactile effects to digital objects (e.g., in a game engine for use in VR gaming, in a videoconferencing application, etc.). In specific examples, developers are able to select a variety of tactile effects and associated parameters (e.g., amplitude of sensation, temporal properties of sensation, etc.), wherein the system 100 enables the application of the tactile features (e.g., tactile effects) to dynamic digital objects (equivalently referred to herein as virtual objects) and subsequently manages the tactile features as the environment changes and/or the user moves.

In a third set of variations, additional or alternative to those described above, the system and/or method confers the benefit of training and using a set of machine learning models to quickly and efficiently determine a set of tactile points associated with a new virtual object. In specific examples, for instance, a set of learned machine learning models (e.g., deep learning models, neural networks, etc.) can be used to automatically assign a set of tactile points (e.g., based on a mesh) to a virtual object.

In a fourth set of variations, additional or alternative to those described above, the system and/or method confers the benefit of efficiently representing information associated with tactile points of virtual objects, which can in turn function to: reduce computational load and/or time of a computing and/or processing system, reduce latency associated with providing tactile commands, and/or any other benefits. In a specific set of examples, for instance, the system and/or method represents a tactile point set and/or a tactile effect associated with a virtual object (or virtual representation of a real object) with an equation (e.g., a parametric equation fit to the tactile points), where the equation can be transmitted and used to operate the tactile device.

In a fifth set of variations, additional or alternative to those described above, the system and/or method confers the benefit of managing multiple tactile commands, such as multiple tactile point sets (e.g., for the same object, for multiple objects, etc.), multiple tactile effects, tactile point sets and tactile effects, and/or any other combination of tactile commands. Additionally or alternatively, the system and/or method can manage and/or optimize for a specific order of tactile points (e.g., sequence in which tactile points are stimulated), a specific subset of tactile points (e.g., only those associated with a dominant hand of the user), and/or any other features.

In a sixth set of variations, additional or alternative to those described above, the system and/or method confers the benefit of adjusting virtual objects to be portrayed to a user with an optimal tactile feel. This can include, for instance, any or all of: scaling a virtual object (e.g., to be optimized for the size of the tactile device), translating and/or rotating a virtual object (e.g., to be in maximal contact with a hand of the user), adding detail to a surface of the virtual object (e.g., through interpolating tactile points in a mesh of the virtual object), and/or otherwise optimizing the user's tactile experience.

Additionally or alternatively, the system and method can confer any other benefit.

3. System 100

The system 100 functions to create and manage information (e.g., data, commands, etc.) with which to produce tactile sensation able to be perceived by a user. Additionally or alternatively, the system 100 can function to provide an interface (e.g., a software development kit [SDK]) with one or more third party systems (e.g., XR systems) and/or tools (e.g., XR system software programs). Further additionally or alternatively, the system 100 can function to enable the introduction of tactile sensation to content including other forms of sensory information (e.g., visual information, audio information, etc.) being perceived by the user, such that the tactile sensation is properly paired with and consistently maintained in relation to the content (e.g., maintained on a digital object as the digital object moves and evolves).

The system 100 is preferably implemented within the environment of an immersive computing environment. The immersive computing environment can be used for any or all of: entertainment (e.g., gaming, concerts, etc.) and/or content viewing (e.g., television, social media content, etc.); task performance (e.g., remote working, working remotely with one or more robotic devices; etc.); communication (e.g., video conferencing); social wellness applications (e.g., immersive video conferencing, tactile interactions between remotely located individuals, etc.) and/or any other suitable environments.

In a first set of variations (e.g., gaming, social wellness conversations, etc.), the immersive computing environment includes an XR system (e.g., as described below) and a tactile interface system (e.g., as described below), wherein the user interacts with digital content (e.g., through a VR headset) while receiving tactile sensation associated with the digital content (e.g., as produced by the method 200 described below).

3.1 System—Components

Figure 7A:
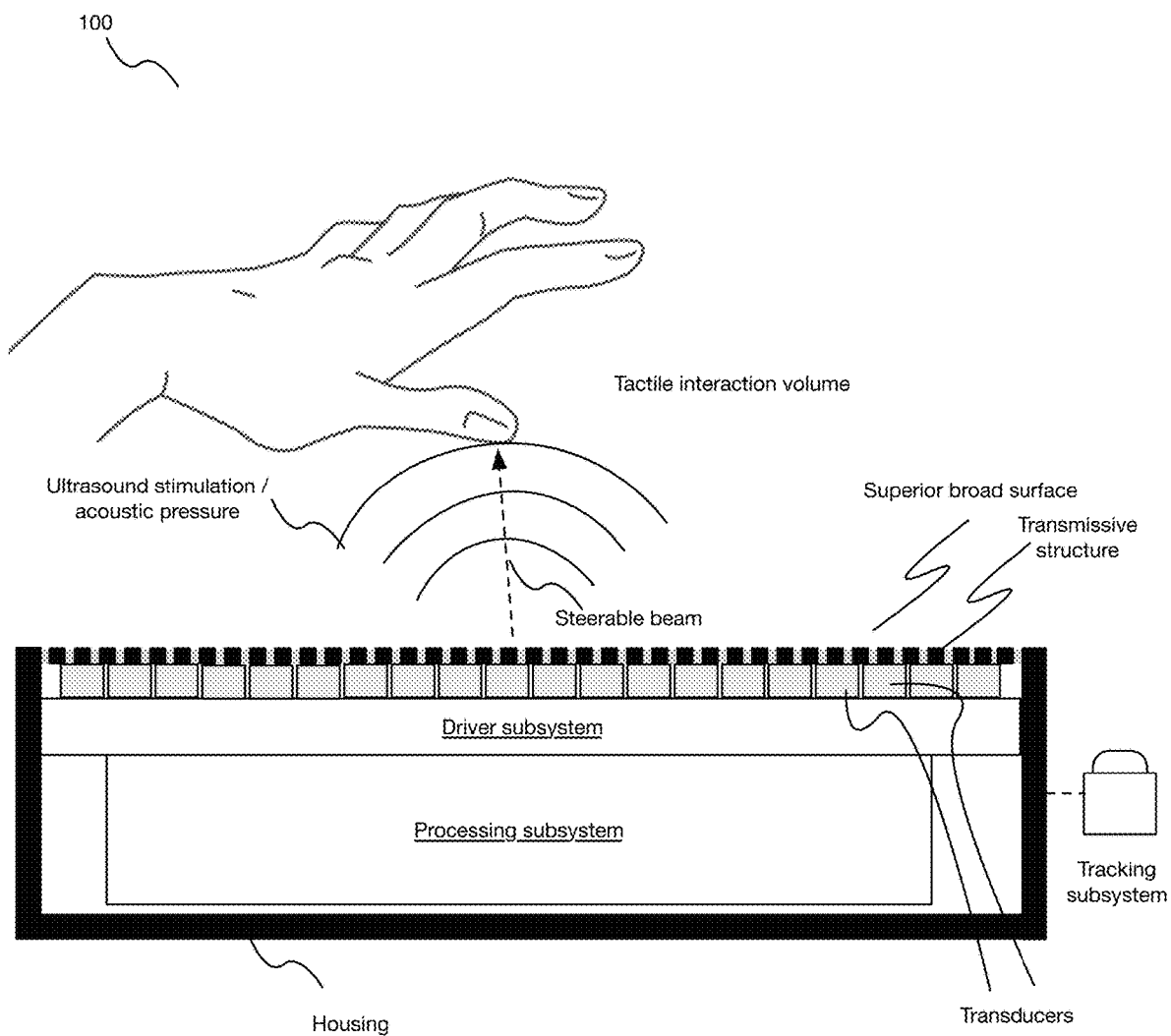
FIGS. 7A-7B depict a variation of a tactile interface system.
Figure 7B:
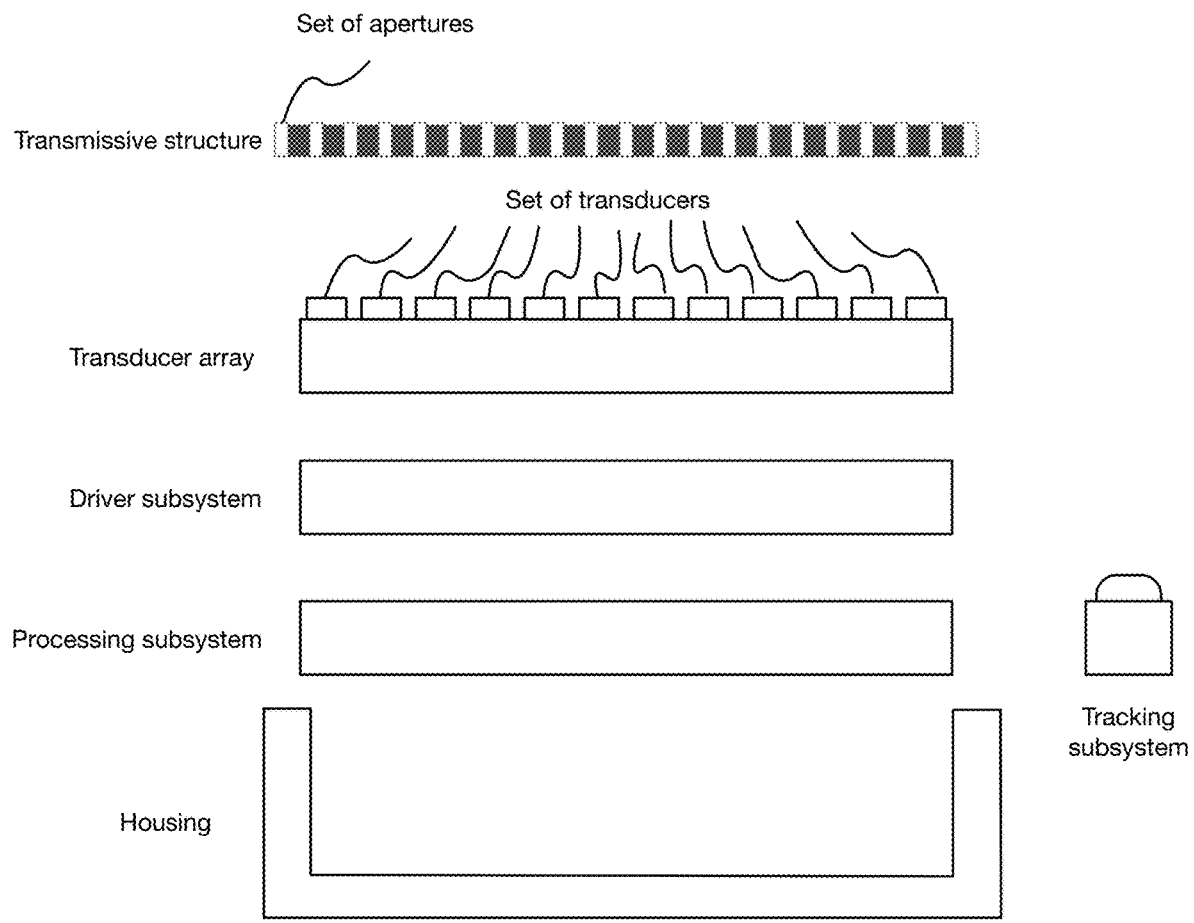

The system 100 includes and/or interfaces with a tactile interface subsystem (e.g., as shown in FIGS. 7A-7B), which functions to produce tactile sensation(s) perceivable by a user based on tactile data and/or commands, such as those produced during the method 200 (e.g., as described below). The tactile interface subsystem includes a tactile interface device (equivalently referred to herein as a tactile device and/or tactile stimulation device and/or tactile engine), which preferably produces mid-air tactile sensation through a set of transducer devices, further preferably a set of ultrasound (equivalently referred to herein as ultrasonic) transducer devices. Additionally or alternatively, the tactile interface device can produce any other form of tactile stimulation (equivalently referred to herein as haptic stimulation) perceivable by a user.

In preferred variations, the tactile device produces ultrasonic tactile sensation (acoustic radiation pressure) through a set of ultrasound transducer devices. The ultrasound transducers preferably include one or more microelectromechanical [MEMS] speaker devices configured to emit sound waves in at least an ultrasonic frequency range (e.g., MEMS audio speakers), but can additionally or alternatively include any other suitable ultrasound devices, such as those producing ultrasonic sensation through an oscillating body, piezoelectric device, and resonator (e.g., funneled resonator to radiate ultrasonic energy to the air).

The tactile device preferably defines a tactile interaction volume, which refers to a volume (e.g., a volume of air) proximal to (e.g., adjacent to) the tactile interface device in which a user can receive/perceive tactile sensation from the tactile device. In preferred variations including a tabletop tactile interface device (e.g., as shown in FIGS. 7A-7B), the tactile interaction volume is above a superior broad surface of the tactile interface device, wherein the ultrasound transducer devices are arranged in a phased array parallel to the superior broad surface.

In additional or alternative variations, tactile sensation can be produced through any other forms or combinations of tactile stimulation, ultrasonic or non-ultrasonic.

In variations involving ultrasonic tactile stimulation, the ultrasonic tactile stimulation is preferably produced at mid-air localized points perceivable by a user with phased array beamforming (e.g., through a set of beamforming algorithms implemented at a processing system associated with the tactile device), which enables virtual objects to be accurately and perceivably produced with high tactile resolution. Additionally or alternatively, the ultrasonic tactile stimulation can be produced with any other algorithms, processes, and/or phenomena.

The system 100 can additionally include and/or interface with an extended reality (XR) system, which can include any or all of: a virtual reality (VR) system, an augmented reality (AR) system, a mixed reality (MR) system, any combination of systems, and/or any other suitable computing system and/or immersive computing system. The XR system preferably functions to provide digital content with which a user interacts in a virtual or augmented environment (e.g., a gaming environment, a task environment such as a virtual surgical environment for use with robotic surgical tools, etc.), but can additionally or alternatively perform any suitable functions.

The XR system can include any number of supplementary devices, such as displays (e.g., holographic displays, screens, etc.), headwear (e.g., VR headset, head mounted display, AR glasses, etc.) and/or other wearables, controllers (e.g., handheld gaming controllers), audio systems (e.g., speakers, headphones, etc.), and/or any other suitable devices.

The supplementary devices can perform any or all of: receiving one or more user inputs (e.g., through one or more buttons of a controller); providing one or more outputs to a user (e.g., a visualization of digital objects, a visualization of virtual objects in gaming, etc.); and/or performing any other suitable functions.

The system 100 is preferably configured to interface with one or more 3$^{rd}$ party tools which can function to create and provide content to a user, wherein the 3$^{rd}$ party tools can include any or all of: software programs (e.g., software-development environments), client applications (e.g., executable on a user device), and/or any other tools. The 3$^{rd}$ party tools can be associated with the creation and control of any or all of: visual layers of content in the immersive computing environment, audio layers of content in the immersive computing environment, and/or any other suitable content. In a set of preferred variations, the system 100 interfaces with a game engine (e.g., Unity, Unreal, etc.) through a software development kit of the system 100, which receives inputs (e.g., from game developers) for tactile content to be produced and applied to digital objects, wherein the method 200 is configured to produce and manage the tactile commands enabling this.

The 3$^{rd}$ party system can additionally or alternatively include one or more communication tools or programs, such as video conferencing programs. In specific examples, tactile effects are attributed to digital objects in a video feed, such that a viewer can virtually interact with a remote individual (e.g., touch a tactile representation of a hand of the remote individual).

The system 100 includes and/or interfaces with one or more tracking subsystems, which function to track any or all of the user for use in providing any or all of: tactile content, visual content, audio content, and/or any other suitable content. The content can be adjusted in any or all of the following ways based on user actions, such as in: temporal properties of the content (e.g., when content is introduced and applied to the user, when content is adjusted, etc.); where content is applied or adjusted (e.g., in which regions of a tactile interaction volume, which portions of a digital object are applied as tactile sensation, etc.); transformation of the content (e.g., rotation, scale, translation, magnification, de-magnification, skew, etc.); how content is applied or adjusted (e.g., at which intensity tactile sensation is applied; spatial location of content; temporal variation in parameters of tactile content such as intensity, rate, shape, etc.; etc.); which content is applied or adjusted (e.g., which digital objects are represented through tactile sensation in a tactile interaction volume; which digital objects are visually displayed to the user; etc.); and/or in any other suitable ways.

A tracking subsystem can be part of and/or interface with any or all of: the tactile interface system, an XR system, another system, any combination of systems, and/or can be independent of any of these systems.

The tracking subsystem(s) can include any suitable tracking device and/or sensors, such as any or all of: optical sensors (e.g., cameras, infrared cameras, etc.); motion and/or orientation sensors (e.g., accelerometers, gyroscopes, inertial measurement units, etc.); audio sensors (e.g., microphones, ultrasound transmitters and receivers); and/or any other suitable devices and sensors.

In preferred variations, the tracking subsystem includes one or more optical sensors, such as cameras (e.g., infrared cameras), which function to detect one or more user actions, wherein user actions can include any or all of: a location of a user (e.g., relative to the sensor, relative to a tactile interface and/or the tactile interaction volume, relative to an XR visualization system and/or virtual object within XR visualization system, etc.); a motion parameter of a user (e.g., direction of movement; speed of movement; type of movement such as walking, running, jumping, crouching, sitting, etc.; etc.); an orientation of a user (e.g., a direction a user is facing); a gesture of a user (e.g., a hand gesture); a gaze of the user (e.g., through eye tracking processes); an identity of the user (e.g., through facial recognition algorithms); and/or any other suitable sensors.

In specific examples, one or more optical sensors of the tracking system is arranged proximal to the tactile interface device to detect the location of a user's hand relative to the XR visualization system (e.g., relative to a tactile interaction volume of the XR visualization system). For example, the tracking system can be configured to track a user's hand (or hands), including a palm portion, a wrist portion, or one or more fingers of the user; additionally or alternatively, the tracking system can be configured to track other appendages of the user, as well as other objects unrelated to the user's body. Optionally, the XR system cam implement one or more optical sensors and/or motion sensors for tracking the user (e.g., position of user within a room, movement of user, etc.).

The system 100 can include a sensor subsystem, which can be part of the tracking subsystem, independent from (e.g., electrically isolated from) the tracking subsystem, interfacing with (e.g., communicatively coupled, electrically coupled, mechanically coupled, etc.) the tracking subsystem, and/or otherwise distributed and arranged.

The system 100 includes and/or interfaces with (e.g., through an XR system) a set of one or more computing subsystems, which can individually and/or collectively function to determine, control, and apply any or all of the content (e.g., tactile content, visual content, audio content, etc.) provided to the user. The computing subsystems can include any or all of: local computing subsystems (e.g., at an XR system device, at/onboard a tactile interface device, etc.), remote computing subsystems (e.g., associated with $3^{rd}$ party tools such as a game engine), and/or any combination of both.

In a preferred set of variations, the computing subsystem includes a front-end computing subsystem and a back-end computing subsystem, which can perform different processes of the method 200 (e.g., as described below). Additionally or alternatively, the computing subsystem can include other components, all processes can be performed at a single component of the computing subsystem, and/or the method 200 can be otherwise performed.

The computing subsystem can include and/or interface with any number of processing systems, wherein the processing system can include any or all of: one or more processors, memory/storage, communications circuitry, a power source and/or power management device, and/or any other suitable components. Processors can include any or all of: a central processing unit (CPU), a graphics processing unit (GPU), an application-specific integrated circuit (ASIC), a field programmable gate array (FPGA), a digital signal processing unit, or any other type of processor (e.g., Application-specific Standard Products [ASSPs], Systems-on-a-Chip [SOCs], Programmable Logic Devices [PLDs], etc.). Processors can include one or more processors, microprocessors, controllers, and/or microcontrollers, each of which can be a discrete chip or distributed amongst (and a portion of) a number of different chips, and collectively, can have the majority of the processing capability for executing instructions stored in memory.

The computing subsystem can interface with any number of control subsystems, such as one or more controllers onboard the tactile device (e.g., tactile point controller described below). Additionally or alternatively, one or more control subsystems can be otherwise arranged. The control subsystem preferably functions to manage and operate on a set of tactile commands (e.g., as described above), but can additionally or alternatively perform any other functions.

The computing subsystem can be configured for any number of performance improvements relative to conventional systems, such as: accelerated parallel processing, reduced latency (e.g., in updating tactile effects based on tracking system information), and/or any other improvements.

In a first variation, a processing subsystem of the computing subsystem computes virtual content from an XR system, processes 3-D positional information from a tracking subsystem associated with a tactile interface device to determine whether a user is in proximity to a virtual object, or the object is within a tactile interaction volume of the VR or AR space, and translates information into coordinates that are transformed into phase maps and intensity values (e.g., beamforming data) for transducers of the tactile interface device.

In a set of variations of the system 100, the system is configured for haptic engagement with users in an immersive computing environment. The immersive environment can be generated by a computing device and related hardware and software operating in conjunction with a haptic interface device and an XR system (e.g., VR system with an HMD, an AR system that projects a hologram of an object (or objects) into a real-world physical space, etc.), wherein the tracking system sends real-time spatial data concerning the movement and position of a user's hand (e.g., 3-D coordinates of the fingertips and palm, or any other tracked body part) to a processing system, wherein the positional information is processed by the processing system to determine whether the user is in proximity to an object in a VR or AR space, or the object is within a tactile interaction volume of the VR or AR space.

The system 100 can include and/or interface with a communication subsystem, which functions to enable communication between components of the system and/or components with which the system interfaces (e.g., between a tactile interface device and components of an XR system, between a computing subsystem of the tactile interface device and a computing system associated with the XR system and/or a $3^{rd}$ party tool, etc.). The communication subsystem can enable wireless communication (e.g., WiFi communication, Bluetooth communication, etc.), wired communication, or any combination. In specific examples, the communication subsystem includes any or all of: ethernet ports, an 802.11x wireless network ("Wi-Fi") port, a Bluetooth or Bluetooth Low Energy ("BLE") wireless link port capable of supporting multiple Bluetooth and/or BLE connections, one or more antennas, and/or any other suitable components.

The system 100 can include and/or interface with application logic executed at a computing subsystem (equivalently referred to herein as a computing system) of the system, which functions to determine and control the commands for tactile sensation (equivalently referred to herein as tactile stimulation) produced at a tactile interface device. The application logic is preferably executed based on a set of inputs received at a computing subsystem, such as any or all of the inputs described in the method 200 below. In preferred variations, at least a portion of the set of inputs is received from a tracking subsystem associated with a tactile interface device (e.g., positional coordinates of a user's hand) and an XR system (e.g., data defining one or more virtual objects), but can additionally or alternatively be received from one or more $3^{rd}$ party tools (e.g., game engine), any suitable computing systems or databases, and/or any other suitable sources.

The application logic can optionally function to control the operation of a set of tactile modes and the characteristics of such tactile modes, such as any or all of: the location and/or trajectory of an applied tactile sensation (e.g., within a tactile interaction volume); movement of a tactile sensation (e.g., speed of movement, direction of movement, etc.); the scale/magnitude of a tactile sensation; temporal properties of a tactile sensation (e.g., time initiated, time terminated, duration, etc.); on/off triggers a tactile sensation (e.g., human gesture triggers, thresholds associated with turning on and off tactile sensations, user proximity thresholds, etc.); and/or any other suitable characteristics. The application logic preferably controls these tactile modes according to a set of rules or algorithms, but can additionally or alternatively implement one or more models (e.g., machine learning models, deep learning models, rule-based models and/or algorithms, etc.), databases or lookup tables, and/or any other tools.

The system is optionally operable in a set of tactile modes, wherein the tactile modes preferably prescribe the representation of a tactile sensation, but can additionally or alternatively prescribe any other features. The set of tactile modes can include a tactile point mode, which prescribes the localized spatial locations that produce tactile sensations. The set of modes can additionally or alternatively include a tactile mesh mode, which prescribes one or more sets of tactile points defining a surface of a visual component of a virtual object. Additionally or alternatively, the tactile point vertices associated with the mesh can be represented as tactile points in the tactile point mode. The set of modes can further additionally or alternatively include a tactile effects mode, which prescribes an animation (a spatio-temporal evolution) of a set of tactile points and/or a tactile mesh. The modes can be applied individually, together (e.g., in parallel), any combination, and/or can be otherwise applied. Additionally or alternatively, the set of tactile modes can include any other tactile modes and/or the method can be performed in absence of tactile modes. In specific examples, for instance, the tactile modes can function to efficiently communicate commands between parts of the system, such as between an API and the tactile device. Additionally or alternatively, the method can be performed in absence of tactile commands (e.g., the tactile points themselves can be communicated) and/or tactile modes can be otherwise implemented.

In one set of variations, the application logic operates in one or more tactile modes in response to characterizing user actions (e.g., as described above), which can include determining if a "collision" between a user and a virtual object has occurred. This can trigger, for instance, any or all of: a set of commands for turning on a tactile mesh of tactile points corresponding to the region of the virtual object involved in the collision with the user's hand, which are subsequently transmitted to the tactile sensation device to be applied by the transducers; adjustment of the mesh as the user's hand moves; turning off of the mesh as the user's hand moves beyond the boundary of the virtual object; and any other suitable actions.

In another variation, a hand gesture (e.g., holding palm up to indicate "stop," thumbs up, thumbs down, swipe right, swipe left, gesture up, gesture down, hold up a certain number of fingers, etc.) performed by the user (and received at the tracking system) can be processed by the application logic to produce commands associated with any or all of: triggering a tactile mode to turn on or off; adjusting a parameter of a tactile mode; moving a tactile representation of a virtual object; and/or any other suitable actions.

The system 100 preferably includes and/or interfaces with an input/output (I/O) processing module, which can be part of and/or implemented with any or all of the components of the computing subsystem described above. The I/O processing module functions to enable information exchange between the computing subsystem and the tactile interface system (e.g., via the communication system), and can additionally function to produce tactile commands, which are then used to produce tactile stimulation at a tactile system. Additionally or alternatively, the I/O processing module can perform any other functions and/or establish communication between any other components.

Figure 4:
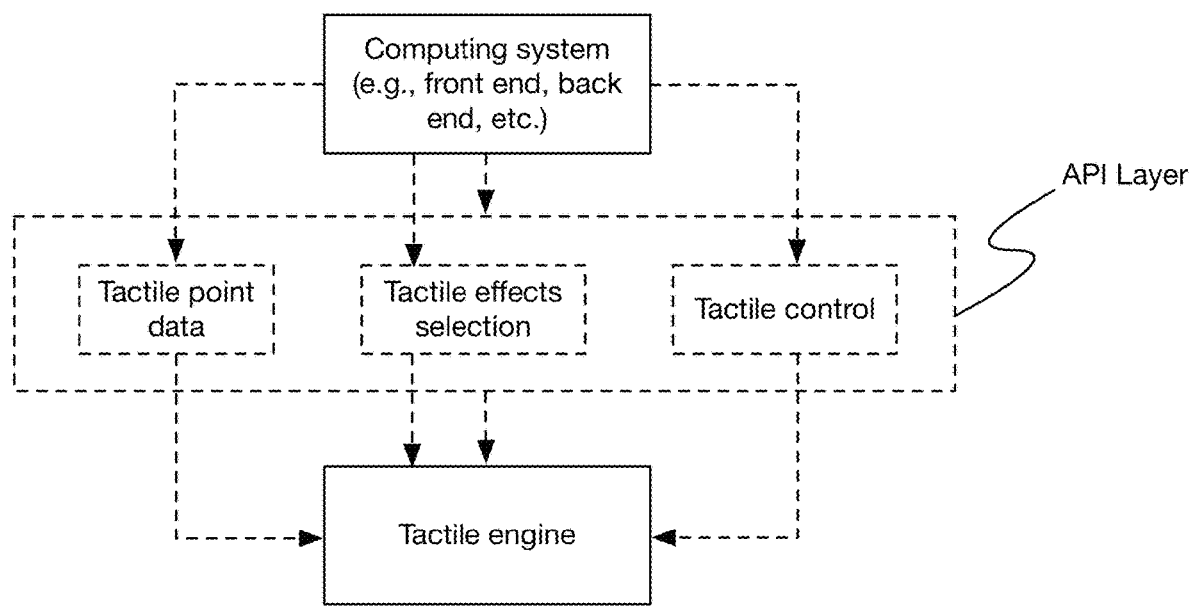
FIG. 4 is a schematic of a variation of a system with an API layer interfacing between a front-end software system (system 100) and a tactile engine.

The I/O processing module includes an application programming interface (API) layer (e.g., as shown in FIG. 4), which includes a set of communication modes in which the API layer communicates tactile sensation commands based on the tactile modes to the tactile interface system (e.g., to back end software of the tactile interface device), which converts the data and commands into signals for producing tactile sensation. The set of communication modes can be communicated independently; together (e.g., in parallel, collectively, etc.); and/or any combination of both.

The set of communication modes preferably includes a tactile point communication mode, which communicates data/parameters (e.g., locations, spacings, point identifiers, direction of movement, speed, etc.) describing a tactile point or set of points (e.g., mesh, grouped set of points, etc.). The data/parameters can include any or ah of: locations of points (e.g., locations of mesh points on the surface of a virtual object as determined based on a visual mesh of the object, subset of mesh points that are "colliding" or predicted to "collide" with the user, etc.); a strength of tactile sensation associated with one or more points; temporal properties of one or more points (e.g., temporally varying locations and strengths of particles from a visual effect like an explosion); and/or any other suitable parameters. The data/parameters can be determined based on any or all of: user actions, virtual object actions (e.g., movement, size, surface features, etc.), one or more algorithms or models (e.g., depicting object movement, kinematics equations, etc.), and/or any other suitable information.

The set of communication modes can additionally or alternatively include a tactile effects mode, which communicates a tactile effects selection (e.g., as described in the developer interface below) and/or parameters associated with the tactile effect. The tactile effects mode can be implemented independently of the tactile points mode, implemented together with the tactile points mode (e.g., to prescribe tactile effects to tactile point data), and/or otherwise implemented.

The set of communication modes can further additionally or alternatively include a tactile control mode, which communicates commands that control the characteristics of defined tactile points. The characteristics can include translation of tactile point sets, rotation of tactile point sets, scaling of tactile point sets, temporal parameters, sequence information, and/or any other characteristics (e.g., as described above, as described in the tactile effects below, etc.). The tactile control mode preferably operates based on data from one or both of the tactile point mode and the tactile effects mode, but can additionally or alternatively be determined based on any other suitable information (e.g., user information from the tracking system, visual information of digital objects, audio information, etc.).

The system 100 can optionally include a developer interface, such as a software development kit (SDK), which functions to enable tactile sensation inputs to be received from developers. The tactile sensation inputs preferably include tactile effect inputs, such as a type of tactile effect and/or any parameters associated with the tactile effect. In a set of variations, developers can assign tactile effects to virtual objects through an SDK, wherein the tactile effects help developers quickly create textures and animation effects that can be easily applied to virtual visual objects. These effects are customizable and are described below.

The tactile effects can include any number of adjustable parameters, which can be selected and/or adjusted by a developer (e.g., based on a value entered by a developer, selected from a slide bar interface, etc.). The parameters can include, for instance, any or all of: an amplitude (e.g., value between 0 and 100, magnitude of the pressure sensation, etc.), intensity, speed, direction, spacing of tactile points, one or more size parameters (e.g., width of tactile sensation, length of tactile sensation, height of tactile sensation, etc.), other spatial parameters (e.g., height of tactile sensation relative to tactile interface device surface), direction of tactile point movement, temporal parameters (e.g., time spent per tactile point), number of repetitions of an animation segment of a tactile effect, and, any other suitable parameters.

The tactile effects can include linear wave effects (1-dimensional waves, 2-dimensional planar waves, 3-dimensional waves, etc.), circular wave effects (e.g., which travel in a concentric circle), spherical wave effects, and/or any other suitable wave effects. Wave parameters can include any or all of: the wave speed (speed at which wave moves), wave slice angle (e.g., full circle circular wave, pie slice circular wave, etc.), wave propagation direction (e.g., from smallest to largest radius in a circular wave, from largest to smallest radius in a circular wave, from left to right, from right to left, up and down, etc.), spacing of tactile points, curvature of wave, and/or any other suitable parameters.

The tactile effects can further include a representation of geometric shapes, such as a circle and/or ring (e.g., with a fixed radius), wherein associated parameters can include any or all of the above. In variations, the adjustable parameters include a radius, number of tactile points, and slice angle. Geometric shapes can additionally or alternatively include polygons, with adjustable parameters including any or all of: a number of sides, a center-to-corner distance (e.g., a maximum radius of a circle enclosing the polygon), a number of points per side, and/or any of the parameters described above.

The tactile effects can also include one or more textures applied to a virtual object, which can cause perceptions of digital objects like spiky, bumpy, hairy, furry, soft, rough, and/or any other feelings. Parameters associated with textures can include any or all of: number of planes of tactile points forming the texture; size parameters, spacing between tactile points, repetition of texture, any or all of the features of waves, and/or any other suitable parameters. In a set of variations, fur on the surface of a virtual object (e.g., as represented as a mesh) is represented through a texture tactile effect, wherein the fur is represented as a wave effect with a small offset between planes and/or curvature of the wave in the wave effect.

The tactile effects can include any number of animation effects, such as an effect providing the sensation of a crawling bug (e.g., on a surface of the user's hand and determined based on hand position information collected at the tracking system), which can include parameters such as: a number of tactile points ("legs"), order in which tactile points move (e.g., in random order, in a prescribed order, etc.), a speed at which the tactile points move, and/or any other parameters. The animation effects can additionally or alternatively include an expanding object, such as an expanding sphere, which provides the sensation of an object moving through and/or past the user's hand. In specific examples of this, a number of tactile points is kept constant (e.g., in a constant angle slice of a sphere), wherein the spacing between points changes with radius as the sphere expands or contracts. Adjustable parameters can include a starting radius, final radius, minimum radius, maximum radius, number of tactile points, rate of expansion, and/or any other suitable parameters. In addition or alternatively to an expanding shape, the animation effects can include a shaking shape, such as a shaking sphere. In specific examples of a shaking sphere, this includes a sphere of tactile points with a set radius that moves in slight motions around the center point, which can indicate an orb-like sensation. Parameters adjustable for this can include any described and/or a radius of movement of the tactile points about the center. The animation effects can further additionally or alternatively include a random walk animation effect, which produces a set number of tactile points that randomly walk within a set boundary (e.g., the boundary of the tactile interaction volume). Adjustable parameters can include a number of steps taken by each tactile point prior to resetting; a length in different directions that a point can move; a spacing between steps; an angular step range indicating the angle in degrees of a point's trajectory relative to a straight line trajectory (o degrees); number of paths (walkers) generated; and/or any other suitable parameters. The animation effects can further additionally or alternatively include a spiral effect, which takes a set of tactile points (e.g., a grid) and moves it in a spiral trajectory (e.g., an Archimedian spiral trajectory). Adjustable parameters can include any or all of: a spiral factor (e.g., rate of change of the radius per angle in radians), minimum spiral radius, maximum spiral radius, number of positions on spiral where tactile points are produced, and/or any other suitable parameters.

The tactile effects can include any number of noise effects (e.g., representing Perlin noise, representing a Perlin circle set, representing a Perlin circular wave, representing a Perlin linear wave, etc.), wherein parameters of the noise effects can include any or all of: a noise frequency (e.g., linear noise frequency, radius noise frequency, etc.), a noise amplitude (e.g., linear noise amplitude, radius noise amplitude, etc.), and/or any other suitable parameters.

Examples of tactile effects are shown in FIGS. 6A-6F.

Figure 3:
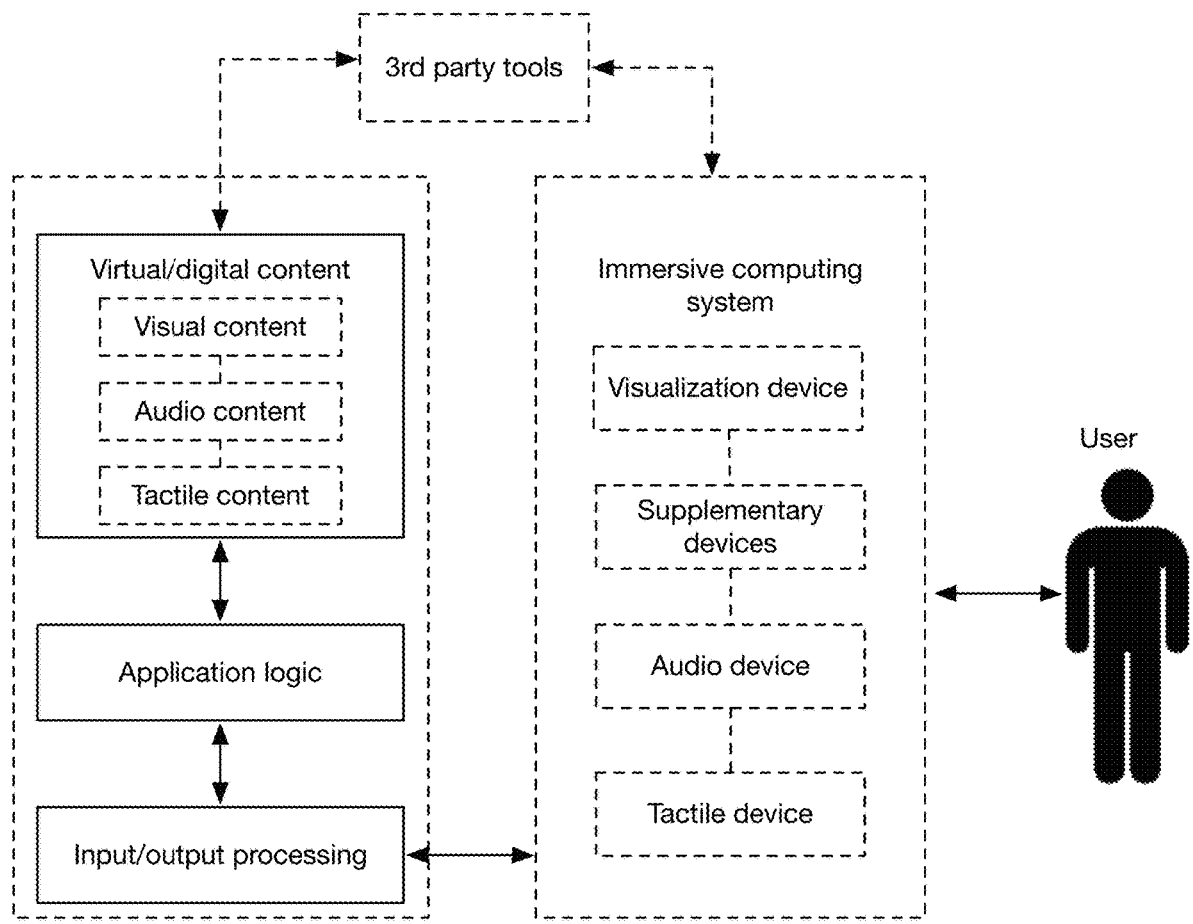
FIG. 3 is a schematic of a variation of a system and associated information for generating and managing tactile commands.

In a first set of variations of the system (e.g., as shown in FIG. 1, as shown in FIG. 3, etc.), the system 100 interfaces with an immersive computing environment including an XR system (e.g., VR system) configured to enable a user to interact with a virtual environment (e.g., visualize virtual objects in a VR system) and a tactile interface system configured to produce tactile sensations corresponding to the virtual environment (e.g., tactile sensations associated with virtual objects), wherein the system includes a computing subsystem executing application logic and an I/O processing system which communicates tactile commands (e.g., as determined with the method 200) and optionally commands for other devices to the tactile interface system. In specific examples, the system 100 is implemented as a front end software system and an SDK, wherein the SDK enables developers of a $3^{rd}$ party tool (e.g., gaming engine) to select and assign one or more tactile effects to a set of virtual objects, and wherein the front end software system includes application logic which determines and manages a set of tactile commands, the tactile commands determined based on at least the tactile effects and the virtual objects, and an input/output processing system, which provides the commands to a tactile interface system to be provided as tactile sensation to a user at an interaction volume defined by the tactile interface system.

Additionally or alternatively, the system 100 can include any or all of the components described above for interfacing with the system.

4. Method 200

As shown in FIG. 2, the method 200 includes receiving a set of inputs S210; processing the set of inputs S220; and communicating tactile commands to a tactile interface system S230. Additionally or alternatively, the method 200 can include operating the tactile interface system based on the tactile commands S240 and/or performing any other suitable processes.

The method 200 functions to prescribe and control the characteristics of tactile sensation based on a variety of inputs, and to determine and convey commands corresponding to the characteristics to a tactile interface system for producing tactile sensation. Additionally or alternatively, the method 200 can function to adapt tactile sensations according to the location, movements, and gestures of a user; enable communication with a developer interface; and/or perform any other suitable functions. The method 200 can control and manage tactile commands for any or all of: a single user, multiple users (e.g., in a multi-user game play environment with minimal lag), and/or any other suitable users or combination of users.

The method 200 is preferably performed with a system 100 as described above, but can additionally or alternatively be performed with any other system(s). The method 200 is further preferably performed at one or more computing subsystems (e.g., remote computing subsystem, local computing subsystem, front-end computing subsystem, back-end computing subsystem, etc.), such as any or all of those described above. In preferred variations, the computing subsystem is at least in communication with a processing system coupled to (e.g., onboard) the tactile interface system, but can additionally or alternatively be onboard the tactile interface system, in communication with and/or onboard an XR system component, and/or any other computing system.

4.1 Method: Receiving a Set of Inputs S210

The method 200 includes receiving a set of inputs S210, which functions to receive information with which to determine one or more characteristics of tactile sensation. The inputs can be received from any or all of: a tracking system, a computing subsystem (e.g., via a communication system, of an XR system, etc.), $3^{rd}$ party tools, feedback from a tactile interface system, a user (e.g., via a supplementary input device such as a gaming controller, via a client application executing on a user device, etc.), and/or any other suitable input sources.

S210 is preferably performed initially in the method 200, and optionally multiple times (e.g., continuously, at a predetermined frequency, at a predetermined set of intervals, at random intervals, in response to a trigger, etc.) during operation of the tactile device. Additionally or alternatively, S210 can be performed in response to any other process(es) of the method 200, in parallel with any other process(es) of the method 200, and/or at any other times. Further additionally or alternatively, the method 200 can be performed in absence of S210.

The set of inputs preferably includes a $1^{st}$ subset of inputs, wherein the $1^{st}$ subset of inputs includes information associated with tactile stimulation to be provided at the tactile device.

Any or all of the $1^{st}$ subset of inputs can be associated with a set of objects, equivalently referred to herein as virtual objects, wherein the tactile stimulation presented at the tactile device represents the virtual objects. In preferred variations, for instance, the tactile stimulation provided at the tactile device is configured to represent a surface of the virtual object such that the user perceives that he or she is touching the surface (e.g., in mid-air).

The virtual objects can represent any or all of: digital objects (e.g., from a $3^{rd}$ party platform such as a gaming platform, to represent components of a digital user interface, etc.), real objects (e.g., humans, animals, objects in an environment of a user such as furniture, walls, etc.), any other objects, and/or any combination. In one set of variations, for instance, the set of virtual objects includes a set of digital objects present in a virtual reality experience (e.g., virtual reality game, virtual reality video, etc.). In a second set of variations, the set of virtual objects includes a human that the user is videoconferencing within an immersive environment (e.g., VR environment, AR environment, etc.). In another set of variations, the digital objects represent a digital user interface which can be interacted with and/or manipulated by a user (e.g., to make selections, adjust content, etc.).

The $1^{st}$ subset of inputs can optionally additionally or alternatively include information associated with a set of tactile features, such as a set of tactile effects (e.g., as described above). The tactile effects can be any or all of: associated with a virtual object (e.g., representing a texture of the virtual object), associated with a point and/or plane in space, associated with a location and/or particular body region of the user (e.g., associated with and following a pointer finger of the user, etc.), independent of a virtual object and/or point and/or plane in space, and/or any combination.

The $1^{st}$ subset of inputs can optionally include a set of tactile points (equivalently referred to herein as a tactile point set), which can represent a virtual object, a tactile effect, any other tactile stimulation, and/or any combination. A tactile point (equivalently referred to herein as a tactile coordinate) preferably includes a location of stimulation (e.g., coordinates, 3D coordinates, etc.), such as an actual or a potential location of stimulation in a virtual volume defined by the tactile device. The tactile point can additionally include any number of parameters associated with the stimulation, such as any or all of: a duration of stimulation, a timing of stimulation, an amplitude of stimulation, and/or any other parameters.

In a preferred set of variations, for instance, each tactile point in a tactile point set represents a focus point at which stimulation can be applied (e.g., through mid-air ultrasonic stimulation), such as in an event that the tactile point is in virtual contact with a user.

In a set of specific examples, the tactile point set associated with a virtual object includes a set of points corresponding to a surface of the virtual object, such as defined by a mesh defining the virtual object (e.g., as described above). Additionally or alternatively, the tactile point set associated with the virtual object can include a set of points defining the volume of the virtual object (e.g., in 3D) and/or any other points.

In another set of specific examples, a tactile effect is associated with one or more tactile point sets defining a dynamic evolution of the tactile effect, wherein tactile points of the tactile point sets and/or tactile point sets can be associated with temporal parameters (e.g., defining the spacing between adjacent tactile point sets, defining the duration of each tactile point set and/or tactile point, etc.).

The $1^{st}$ subset of inputs can additionally or alternatively include a tactile effects selection/assignment, such as from a tactile effects dictionary, database, lookup table, and/or any other source. In a set of variations, for instance, the tactile effect is selected from a database of algorithms that calculate tactile point sets in a dynamic fashion. Additionally or alternatively, the tactile effects can be defined directly by tactile point sets, determined based on a machine learning model, and/or otherwise determined.

In a set of specific examples, for instance, a tactile effect can be assigned (e.g., to a digital object during a game development, to a human participating in a VR teleconference, etc.) and/or selected using a predefined tactile library for tactile effects. In the specific examples, the tactile effect assignment includes a predetermined point set with animation parameters. In a particular specific example, for instance, the $1^{st}$ subset of inputs includes an input from a developer interface (e.g., an SDK) in communication with a 3rd party tool (e.g., game engine), such as the selection of one or more tactile effects along with parameters associated with the tactile effects.

The tactile point sets can be in the form of and/or include any or all of: lists, objects, arrays, libraries, or other computational data structures or methods for storing information.

The set of inputs further preferably includes a 2nd subset of inputs, wherein the 2nd subset of inputs includes information associated with a user. The 2nd subset of inputs is preferably collected from a tracking subsystem, but can additionally or alternatively be collected from any other components.

In a preferred set of variations, the 2nd subset of inputs includes information from one or more tracking subsystems, further preferably at least information related to a user's interaction with (e.g., hand location and orientation) and proximity to the tactile interface, such as a set of locations (e.g., coordinates) associated with the user. The set of locations can be associated with a predetermined body region and/or body part of the user, such as a hand of the user, a particular (e.g., predetermined) set of landmarks arranged on the hand (e.g., fingers, fingertips, bones, joints, knuckles, palm, wrist, etc.), other body regions of the user (e.g., leg, torso, head, eyes, mouth, etc.), and/or any other locations.

In a set of specific examples, for instance, the 2nd subset of inputs includes coordinates associated with a predetermined set of landmarks (equivalently referred to herein as reference points) on a hand of the user, such as locations corresponding to any or all of: a user's fingertips, a user's metacarpal bones, a user's palm, and/or any other landmarks.

The set of inputs can additionally or alternatively include any or all of: visual content (e.g., digital content/digital objects from an XR system), audio content (e.g., from a user, from a game at an XR system, etc.), tactile content (e.g., produced at the tactile interface system, previous tactile commands, etc.), and/or any other suitable content.

In a first set of variations, S210 includes receiving a tactile point set defining a surface of one or more virtual objects, wherein the tactile point set includes a set of locations and optionally any other parameters (e.g., amplitude, temporal parameters, etc.). S210 additionally includes receiving a set of locations corresponding to a predetermined body region associated with the user from a tracking subsystem.

In a second set of variations, S210 includes receiving a tactile effect selection from a library of tactile effects, wherein the tactile effect selection prescribes a predetermined set of tactile points and optionally any number of parameters (e.g., temporal parameters, amplitudes, etc.) associated with the tactile points. S210 additionally includes receiving a set of locations corresponding to a predetermined body region associated with the user from a tracking subsystem.

In a third set of variations, S210 includes receiving a tactile effect selection from a library of tactile effects, wherein the tactile effect selection prescribes an algorithm defining the dynamic evolution of a tactile point set. S210 additionally includes receiving a set of locations corresponding to a predetermined body region associated with the user from a tracking subsystem.

In a fourth set of variations, S210 includes receiving any combination of inputs described in the above variations.

4.2 Method: Processing the Set of Inputs S220

The method 200 includes processing the set of inputs S220, which functions to determine a set of tactile commands with which to provide tactile stimulation to the user (e.g., according to the set of inputs). Additionally or alternatively, S220 can function to determine commands associated with one or more of a set of tactile modes (e.g., as described above), such as any or all of: tactile point data, tactile mesh data, tactile effects data, and/or any other suitable data. Further additionally or alternatively, S220 can perform any other functions.

S220 is preferably performed in response to and based on S210, and optionally multiple times (e.g., continuously, at a predetermined frequency, at a predetermined set of intervals, at random intervals, in response to a trigger, etc.) during operation of the tactile device, such as in response to each iteration of S210. Additionally or alternatively, any or all of S220 can be performed prior to S210, in response to any other process(es) of the method 200, in parallel with any other process(es) of the method 200, and/or at any other times. Further additionally or alternatively, the method 200 can be performed in absence of S220.

S220 is preferably performed at a computing subsystem, such as at a remote computing subsystem (e.g., cloud computing subsystem). Additionally or alternatively, any or all of the S220 can be performed at a local computing subsystem (e.g., onboard the tactile device, onboard a user device such as a computer of a developer, front end computing subsystem, etc.), and/or at any other components or combination of components.

Processing the set of inputs can include characterizing a set of virtual objects, such as: deriving a spatial mesh characterizing an exterior surface of a digital object, determining a trajectory and/or motion of a digital object, determining a location of a virtual object, and/or any other suitable characterizations. Additionally or alternatively, characterizations of virtual objects can be received directly (e.g., from a 3rd party tool interfacing with the XR system). Additionally or alternatively, processing the set of inputs can include any or all of: operating in one or more of a set of tactile modes (as described above); toggling between tactile modes; determining a set of tactile sensation characteristics (e.g., calculating a set of parameters) associated with tactile modes (e.g., as described above); and/or any other processing steps. Tactile modes can additionally or alternatively be introduced or modified based on game play, programmatic events or other conditions (e.g., independent of user, based on user, etc.).

In a preferred set of variations, processing the set of inputs includes modeling one or more virtual objects to determine a tactile point set associated with the virtual object (e.g., as described above). In some examples, this is performed prior to S210, such that the tactile point sets resulting from the modeling are received as inputs in S210. Additionally or alternatively, the modeling can be performed after S210 (e.g., in response to receiving a representation of the digital object, dynamically, etc.) and/or at any other times.

Modeling a virtual object preferably includes modeling a surface of the virtual object, such as a through a meshing process, wherein the vertices of the mesh preferably form the tactile point set associated with the virtual object. The tactile point set can be equal to the set of vertices (e.g., one tactile point per vertex), a subset of the set of vertices, additional points relative to the set of vertices, derived from the set of vertices (e.g., with a set of equations, algorithms, models, etc.), and/or otherwise determined (e.g., independent of the set of vertices). Additionally or alternatively, modeling the virtual object can include modeling a volume of the virtual object, modeling one or more points of the virtual object, modeling multiple surfaces of the virtual object, and/or any other processes.

Modeling the virtual object can be performed any or all of: manually (e.g., by a developer), automatically (e.g., with an algorithm, with a model, with artificial intelligence, with a machine learning model, with a deep learning model, etc.), or any combination. In a set of specific examples, a mesh for a virtual object is determined with machine learning style transfer techniques to use knowledge learned from previous tactile models for rapid iteration.

The models associated with virtual objects can optionally be stored (e.g., in a library, database, etc.) for easy retrieval, sharing, and/or for any other functions. Additionally or alternatively, any or all the models can be dynamically determined.

S220 can additionally or alternatively include editing, optimizing, and/or otherwise adjusting a model of a virtual object and/or a tactile point set (e.g., associated with a virtual object, associated with a tactile effect, etc.). This can include, for instance, any or all of: scaling a model (e.g., increasing the size of a mesh, decreasing the size of a mesh, etc.) such as based on the size of the tactile device, based on the size and/or location of a user, and/or based on any other features; adding detail/resolution to the model (e.g., interpolating a mesh as shown in FIGS. 11A-11B); removing detail/resolution from the model (e.g., simplifying a mesh to decrease computational requirements, to decrease latency, etc.); cleaning a model (e.g., removing artifacts from a mesh); merging models; exporting a model (e.g., to be sent for content augmentation and/or provision at a $3^{rd}$ party client application); and/or otherwise editing the model(s).

Figure 11A:
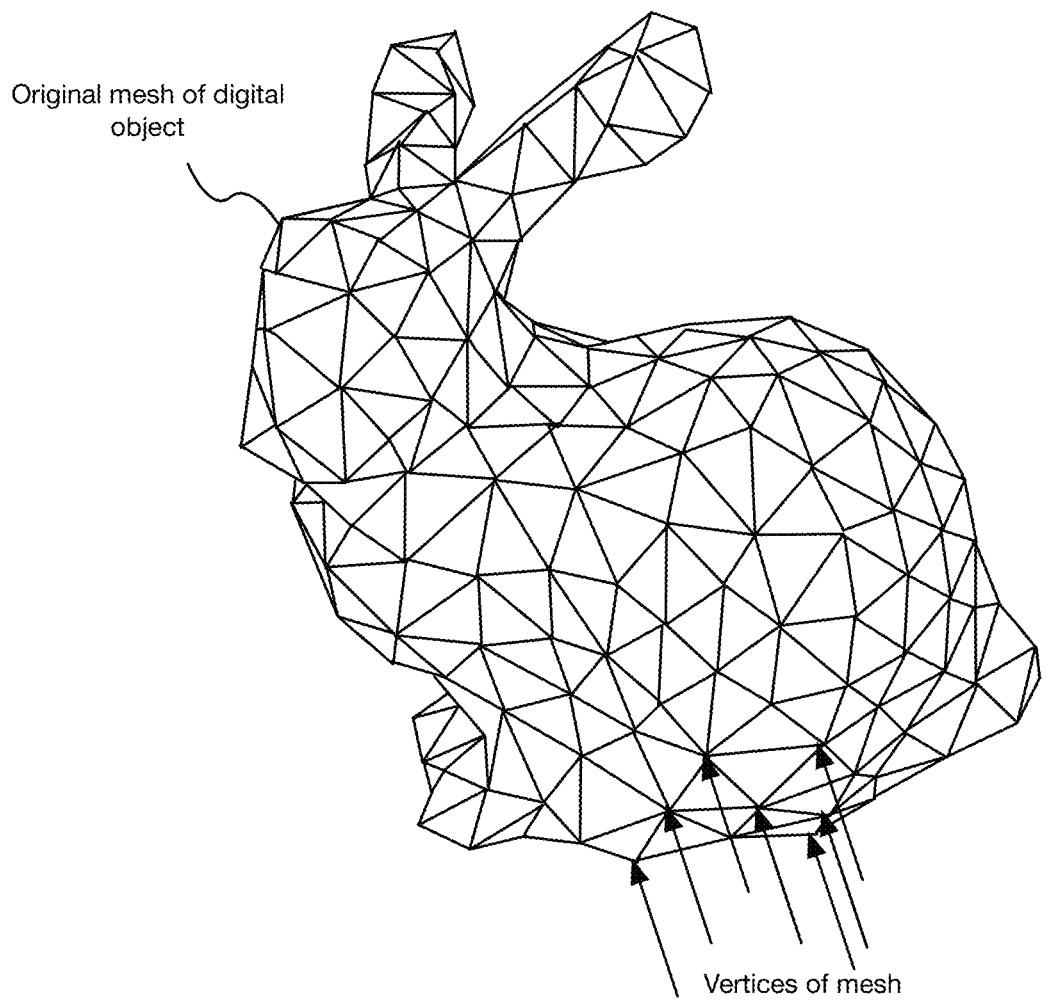
FIGS. 11A-11B depict a variation of interpolating a mesh.
Figure 11B:
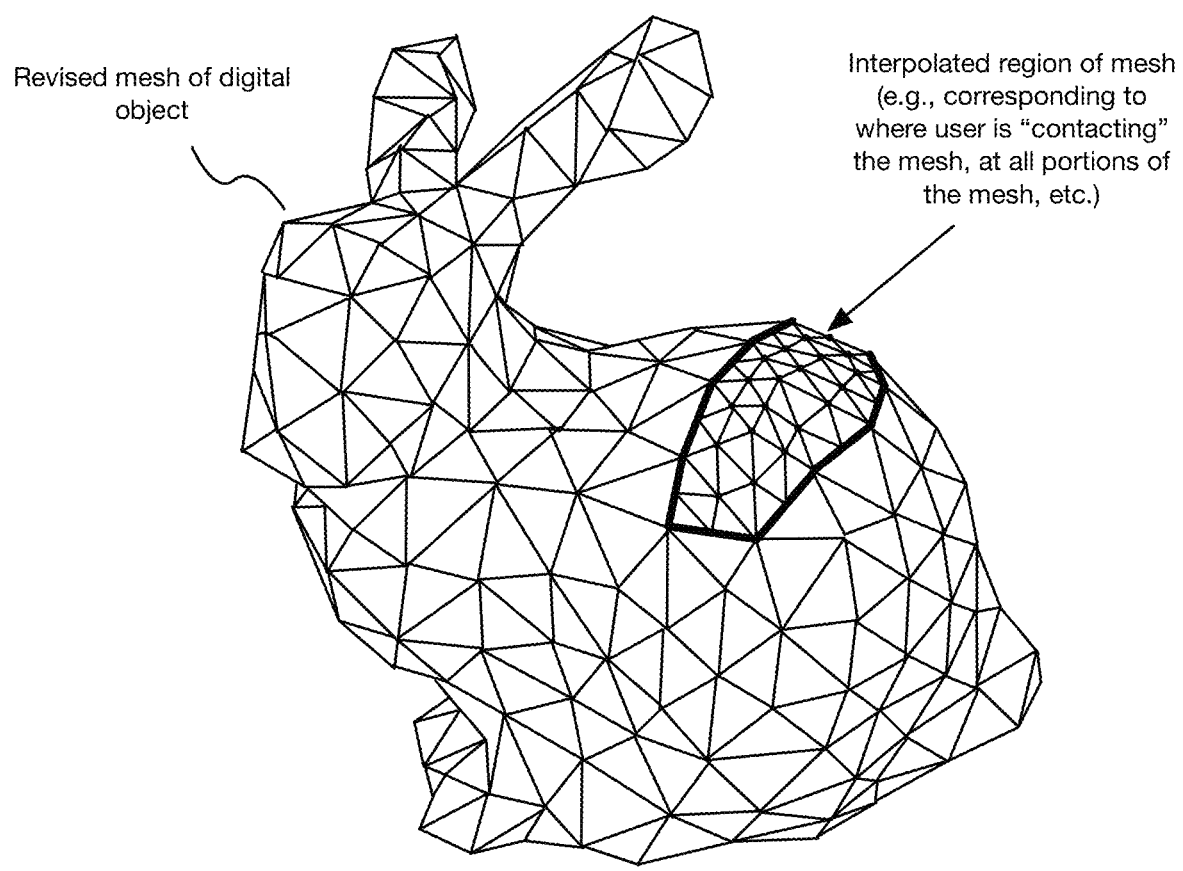

In a set of specific examples (e.g., as shown in FIGS. 11A-11B), for instance, S220 can include interpolating a mesh to increase the resolution of the mesh and thereby increase the number of tactile points associated with the virtual object, allowing for a higher resolution and more accurate tactile experience for the user. If a mesh for a virtual object has sparse vertices and therefore a low number of tactile points, for instance, interpolating the mesh can increase the resolution making the virtual object feel smoother and/or more robust and/or more realistic to the user.

In another set of specific examples, additional or alternative to the first, S220 can include scaling a mesh of a virtual object to optimize the size of the virtual object relative to the size of the tactile device and its interaction volume. This can further be optimized based on the resolution of the mesh (e.g., scaled based on the largest size allowed within the interaction volume while still maintaining at least a minimum resolution).

S220 can optionally additionally or alternatively include representing any or all of the set of inputs (e.g., the $1^{st}$ subset of inputs, the $2^{nd}$ subset of inputs, etc.) and/or models with a set of one or more equations. This can include for instance, any or all of: representing a model and/or mesh with an equation; representing a set of tactile points with an equation; representing a tactile effect with an equation; and/or representing any other information with an equation. This can have numerous computational benefits (e.g., reducing the information size, reducing computation of processing the set of inputs, etc.), such as in simplifying the communication of information in S230 and/or simplifying any other processes of the method. Additionally or alternatively, this can function to make the tactile representations more robust and easily manipulatable (e.g., as a virtual object moves, as a user moves, etc.).

The equation can be determined manually, automatically, or any combination. In specific examples, the equation is determined with a machine learning model. In other specific examples, the equation is determined with one or more fitting processes, such as fitting a parametric equation to a set of tactile points.

The equation is preferably a parametric equation, but can additionally or alternatively include non-parametric equations and/or any other equations.

In a first set of specific examples, S220 includes determining an equation with which to represent a tactile point set determined based on the vertices of a mesh of a virtual object.

In a second set of specific examples, S220 includes determining an equation with which to represent a tactile effect, such as an equation representing the tactile point set(s) defining the tactile effect and their dynamic (e.g., temporal) properties.

S220 can optionally include determining one or more tactile point sets to define a tactile effect, along with any number of parameters associated with the tactile point sets, such as temporal parameters associated with dynamic features (e.g., duration of tactile point set, temporal spacing between tactile point sets, etc.) of the tactile effect. In a specific example, determining the tactile point set(s) and/or parameters associated with a tactile effect is performed in a back-end computing subsystem (e.g., at the tactile device, remote from the tactile device, etc.) based on a tactile effects command (e.g., including the selection of a tactile effect command from a tactile library). In another specific example, the tactile point set(s) and/or parameters are created in a front-end computing subsystem. In yet another specific example, the tactile point set(s) and/or parameters are stored and referenced from a library and/or database. Additionally or alternatively, tactile effect can be otherwise defined and/or created.

S220 can optionally include assigning tactile effects (e.g., as defined by one or more tactile point sets, as defined by a library selection, as defined by an equation, etc.) to any or all of: one or more virtual objects, a point (e.g., in virtual space, in a virtual volume defined by the tactile device, etc.), a plane (e.g., in virtual space, in a virtual volume defined by the tactile device, etc.), a region (e.g., in virtual space, in a virtual volume defined by the tactile device, etc.), a particular part (e.g., anatomical region, hand, fingertips, etc.) of a user, and/or to any other objects or locations.

In a first variation, for instance, a tactile effect representing a texture (e.g., as defined by a set of tactile points dynamically moving in a predetermined way) can be assigned to a surface of a virtual object representing an animal, such that when the user contacts the virtual object, the texture effect can be provided to the user such that the user perceives that he is petting the animal in mid-air.

In a second variation, a tactile effect can be assigned to all virtual objects having a planar region above a predetermined threshold size, such that when the user virtually interacts with any or all of these objects, the tactile effect is provided.

S220 preferably includes determining a user location based on the $2^{nd}$ subset of inputs, further preferably based on information collected from a tracking subsystem, which functions determine if, when, and where the user has made virtual contact with a virtual object and/or tactile effect.

Determining the user location preferably includes determining the locations of a set of reference points corresponding to particular landmarks and/or anatomical regions of the user based on data from the tracking subsystem and optionally one or more models of the user (e.g., dynamically determined models, predetermined models, etc.). Data collected from a tracking subsystem is used to determine locations corresponding to these reference points as the user moves around, such that virtual contact with tactile information can be determined.

In a preferred set of variations, the set of reference points are located on one or more hands of the user, such that the user interacts with the tactile stimulation with his or her hands. Additionally or alternatively, the set of reference points can be located at any other body regions of the user, such as but not limited to, any or all of: the user's head, neck, torso, arms, wrists, legs, feet, and/or any other locations.

In a set of specific examples, for instance, a predetermined set of reference points are defined for a hand, wherein the reference points can correspond to (e.g., be located at, be arranged at, be assigned to, etc.), for instance, any or all of: bones of the user's hand, fingertips, fingernails joints, knuckles, landmarks (e.g., lines) of the palm, and/or any other features of the hand.

Additionally or alternatively, the user's location can be defined by one or more surfaces, volumes, equations, models, and/or other tools.

Virtual contact refers to a contact and/or overlap between the user and the tactile stimulation (e.g., virtual objects, tactile effects, etc.), such as in the event that both are assigned to the same coordinates and/or substantially the same coordinates (e.g., within a predetermined distance, overlapping, partially overlapping, etc.). This can be thought of, for instance, as the user virtually touching the tactile stimulation (e.g., digital objects). This virtual contact is preferably defined by a set of virtual contact points (tactile points in virtual contact with the user) and/or a virtual contact region, but can additionally or alternatively be otherwise defined. Virtual contact is preferably detected at a front-end computing subsystem (e.g., remote computing subsystem, cloud computing subsystem, computing subsystem offboard the tactile device, etc.), but can additionally or alternatively be detected at a back-end computing subsystem (e.g., onboard the tactile device), and/or at any other computing subsystem(s) or combination of computing subsystems.

Figure 10A:
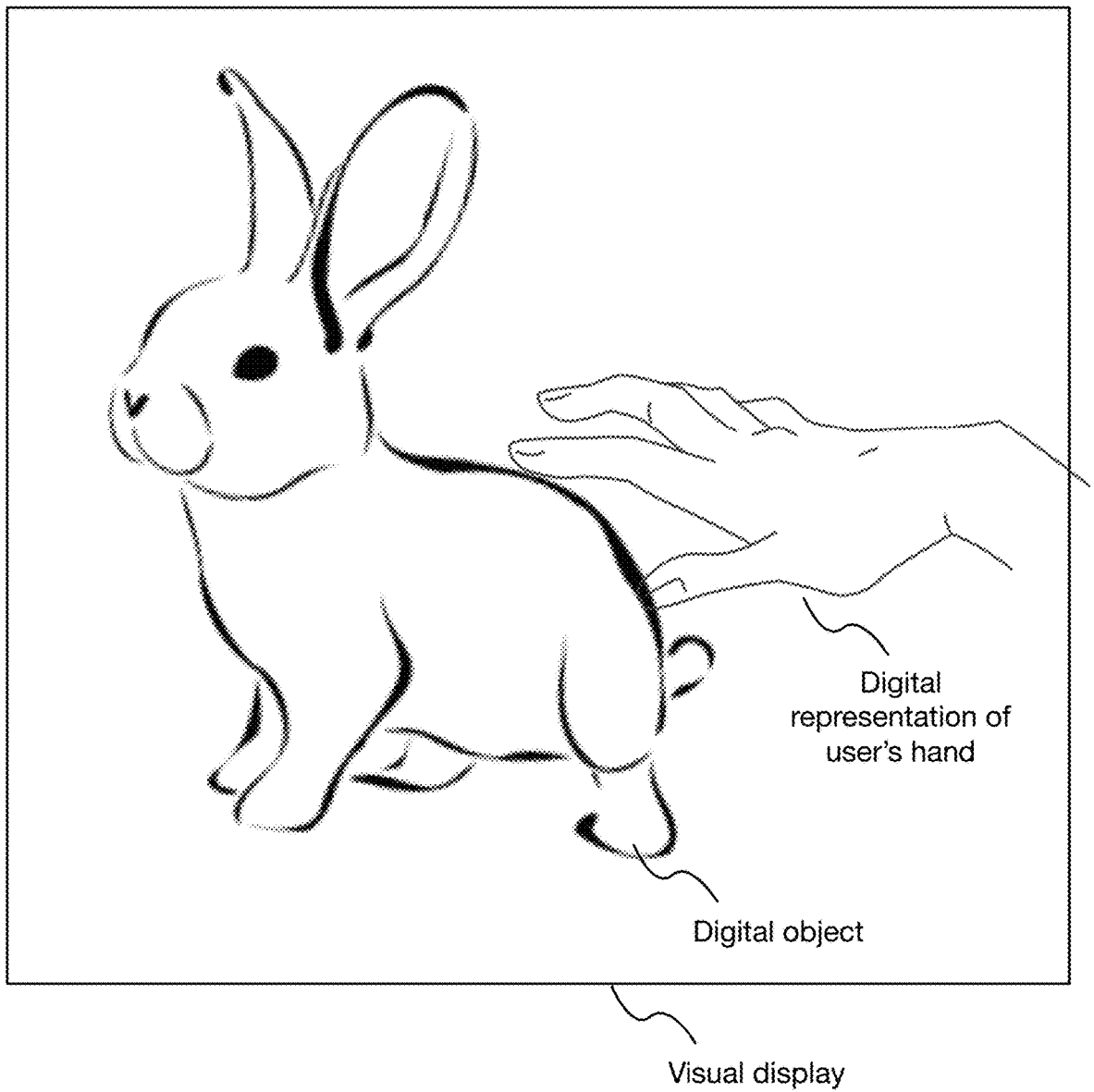
FIGS. 10A-10C depict a variation of providing tactile content to a user based on a digital object.
Figure 10B:
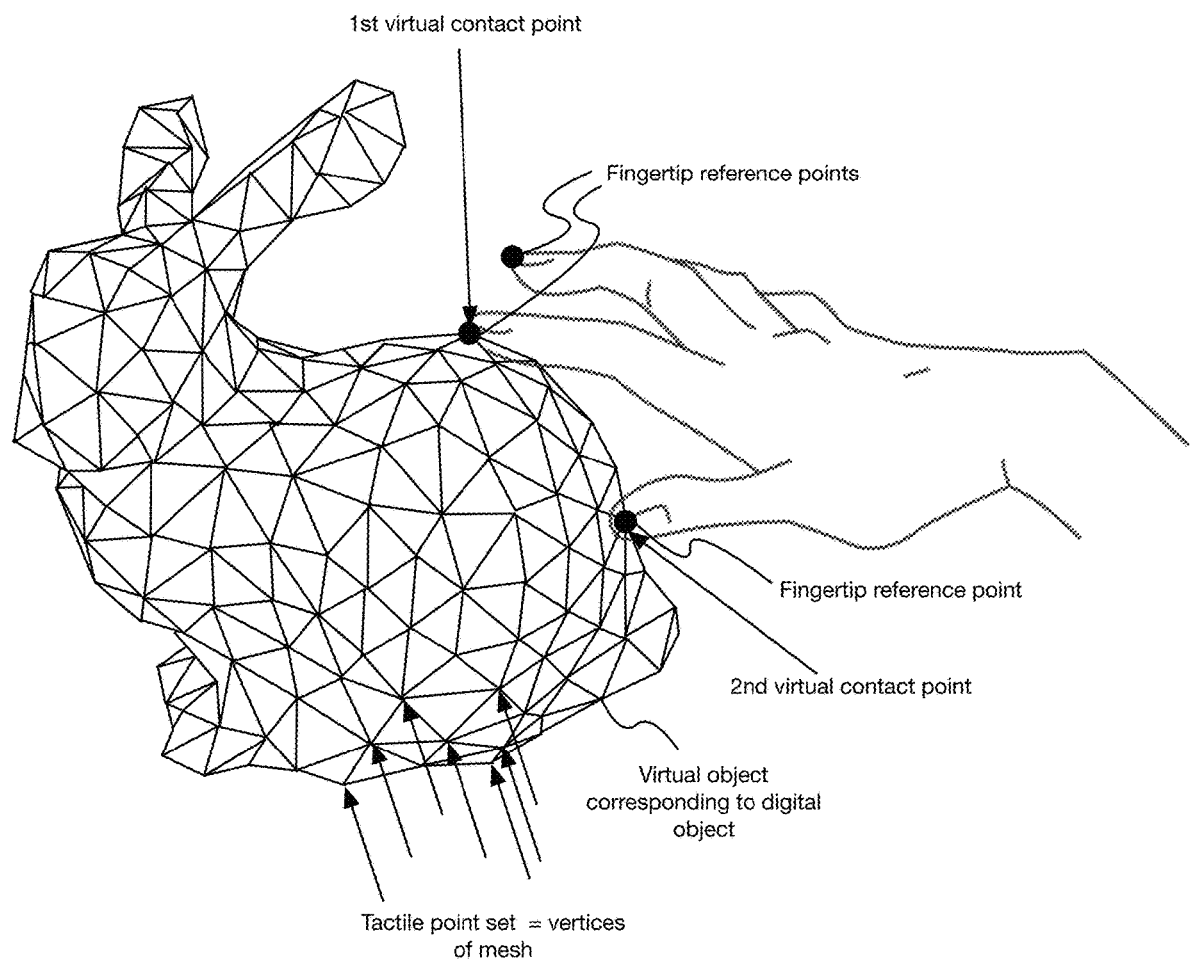
Figure 10C:
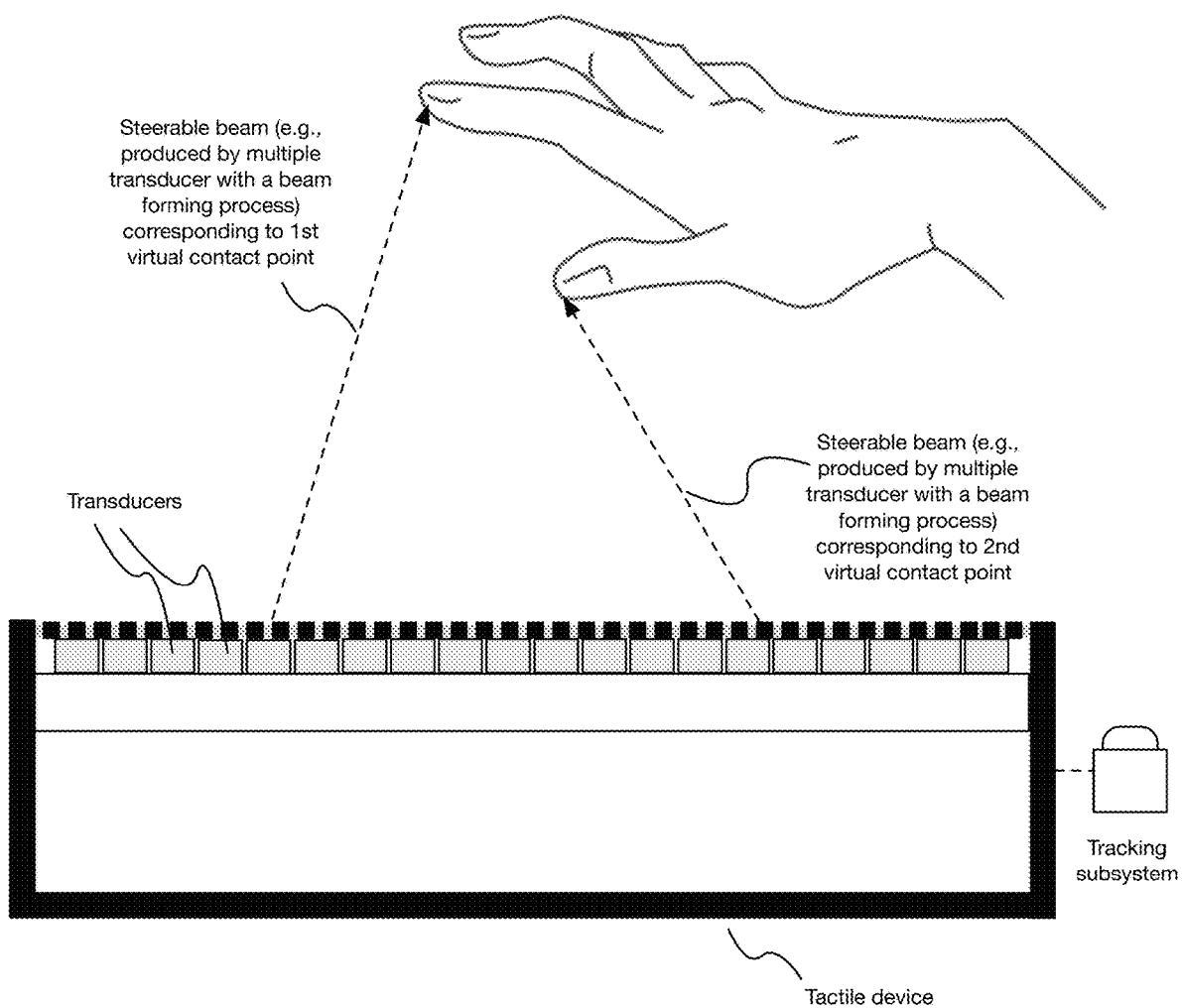

In preferred variations, for instance, S220 includes determining a set of virtual contact points between the user and virtual objects and/or tactile effects based on detecting an overlap and/or a proximity within a predetermined distance threshold (e.g., 1 centimeter, 10 millimeters, 5 millimeters, 1 millimeter, less than 5 centimeter, less than 1 centimeter, less than 50 millimeters, etc.). In a set of specific examples (e.g., as shown in FIGS. 10A-10C) involving a tactile point set (e.g., for a virtual object, for a tactile effect, etc.), the set of virtual contact points include any points of the tactile point set which overlap with and/or are proximal to a set of reference point associated with the user. Additionally or alternatively, virtual contact can be otherwise determined (e.g., with a set of machine learning models, algorithms, etc.) and/or defined.

S220 can optionally additionally or alternatively include determining other user features, such as one or more cues or gestures (e.g., blinking, holding hand in a predetermined configuration, particular facial expression, etc.) indicated by a user. These can be used, for instance, to initiate a tactile effect, control and/or adjust one or more features of content (e.g., virtual reality content, visual content, audio content, tactile content, etc.) portrayed to the user, and/or be otherwise used.

S220 can optionally additionally or alternatively include modifying one or more tactile sensation characteristics based on any or all of: user interactions, game play conditions, introduction of new content (e.g., new audio sounds, moving digital objects, etc.), and/or any other suitable information.

S220 can optionally additionally or alternatively determining a set of tactile commands based on a set tactile modes, which functions to provide commands associated with the production of tactile sensations to the tactile interface system (e.g., high level commands which are subsequently processed by a processing system of a tactile interface system).

In a first set of variations, S220 includes processing the $1^{st}$ subset of inputs to determine locations and/or features of tactile content such as tactile point sets and/or tactile effects; processing the $2^{nd}$ subset of inputs to determine a set of locations of the user; and based on the $1^{st}$ and $2^{nd}$ subsets of inputs, determining locations of virtual contact between the user and the tactile content. Additionally or alternatively, S220 can include any or all of: modeling a virtual object (e.g., to determine a set of mesh vertices); assigning tactile effects to a virtual object and/or a region in space; determining an equation which represents any or all of the tactile content; detecting a cue and/or gesture from a user; and/or any other processes.

In a first set of specific examples, determining locations of virtual contact includes detecting an overlap, contact, and/or close proximity (e.g., within a predetermined threshold) between reference points associated with a body region of the user (e.g., reference points of user's hand(s)) and a set of tactile points associated with a virtual object and/or tactile effect.

In a second set of specific examples, determining locations of virtual contact includes detecting an overlap, contact, and/or close proximity (e.g., within a predetermined threshold) between reference points associated with a body region of the user (e.g., reference points of user's hand(s)) and a predetermined geometry (e.g., a plane) associated with a tactile effect.

Additionally or alternatively, S220 can include any other suitable process(es) performed in any suitable order.

4.3 Method: Communicating a Set of Tactile Commands to the Tactile Device S230

The method 200 can include communicating a set of tactile commands to the tactile device S230, which functions to enable the production and/or modification of tactile content (tactile sensations) and/or other content to the user (e.g., updating of visual content at a visualization device of an XR system, updating of audio content at a speaker of an XR system, etc.). Additionally or alternatively, S230 can function to receive information (e.g., status updates) from a tactile device and/or perform any other functions.

S230 is preferably performed in response to and based on S220, and optionally multiple times (e.g., continuously, at a predetermined frequency, at a predetermined set of intervals, at random intervals, in response to a trigger, etc.) during operation of the tactile device, such as in response to each iteration of S220. Additionally or alternatively, any or all of S230 can be performed prior to any other process(es) of the method 200, in response to any other process(es) of the method 200, in parallel with any other process(es) of the method 200, and/or at any other times. Further additionally or alternatively, the method 200 can be performed in absence of S230.

The tactile commands are preferably communicated from a $1^{st}$ computing subsystem (e.g., front-end computing subsystem, remote computing subsystem, etc.) to a $2^{nd}$ computing subsystem onboard the tactile device through a controller (equivalently referred to herein as a tactile points controller). Additionally or alternatively, the tactile commands can be generated at the same computing subsystem of the tactile device (e.g., onboard the tactile device); the tactile commands can be transmitted to a computing subsystem remote from the tactile device; the tactile commands can be transmitted in absence of a controller; the tactile commands can be transmitted to a processing subsystem and/or control subsystem and/or driver subsystem of the tactile device; and/or S230 can be otherwise suitably performed with and/or between any suitable components.

The tactile commands preferably include and/or determined based on and in accordance with the set of outputs produced in S220 (e.g., virtual contact points, tactile point sets, etc.). In preferred variations, for instance, the set of tactile commands include high level commands and/or instructions for the locations and/or other parameters (e.g., amplitude, timing, etc.) at which tactile stimulation should be and/or could be applied (e.g., pending user location), but can additionally include and/or be determined based on any other information. Additionally or alternatively, any or all of the outputs produced in S220 can be produced after a set of commands have been transmitted to the tactile device. In some variations, for instance, any or all of the $2^{nd}$ subset of inputs and the virtual contact points are received and/or determined at the tactile device.

The tactile commands preferably include high level commands for the locations of potential (e.g., depending on where the user is located) and/or actual stimulation (e.g., a set of virtual contact points) to be applied to the user. Additionally or alternatively, the commands can include any other parameters associated with tactile stimulation, such as an amplitude of stimulation, temporal parameters (e.g., timing, duration, etc.) of stimulation, parameters of other content (e.g., visual content, audio content, etc.), and/or any other parameters.

In some variations, for instance, the set of tactile commands includes commands to produce tactile stimulation at a set of virtual contact points. In additional or alternative variations, the set of tactile commands includes commands to produce tactile stimulation in accordance with a tactile effect, which can include, for instance, a set of tactile commands to produce any or all of: a set of tactile points defining the tactile effect; a tactile effect assignment (e.g., command for "expanding sphere" tactile effect); an equation defining the tactile effect; and/or any associated commands. In additional or alternative variations, the set of tactile commands includes commands to potentially produce tactile stimulation at a set of tactile points, which are then used in conjunction with user location information to determine commands associated with producing tactile stimulation at a set of virtual contact points. In additional or alternative variations, the set of tactile commands includes commands to produce tactile stimulation in accordance with an equation (e.g., parametric equation). Additionally or alternatively, the set of tactile commands can include commands with which to directly activate transducers of the tactile device and/or any other suitable commands.

Tactile commands can be sent at any or all of: a predetermined frequency and/or rate (equivalently referred to herein as a frame rate); in response to a digital object moving and/or changing form; in response to the user moving; in response to another trigger; at random intervals; and/or at any other time(s).

Figure 9:
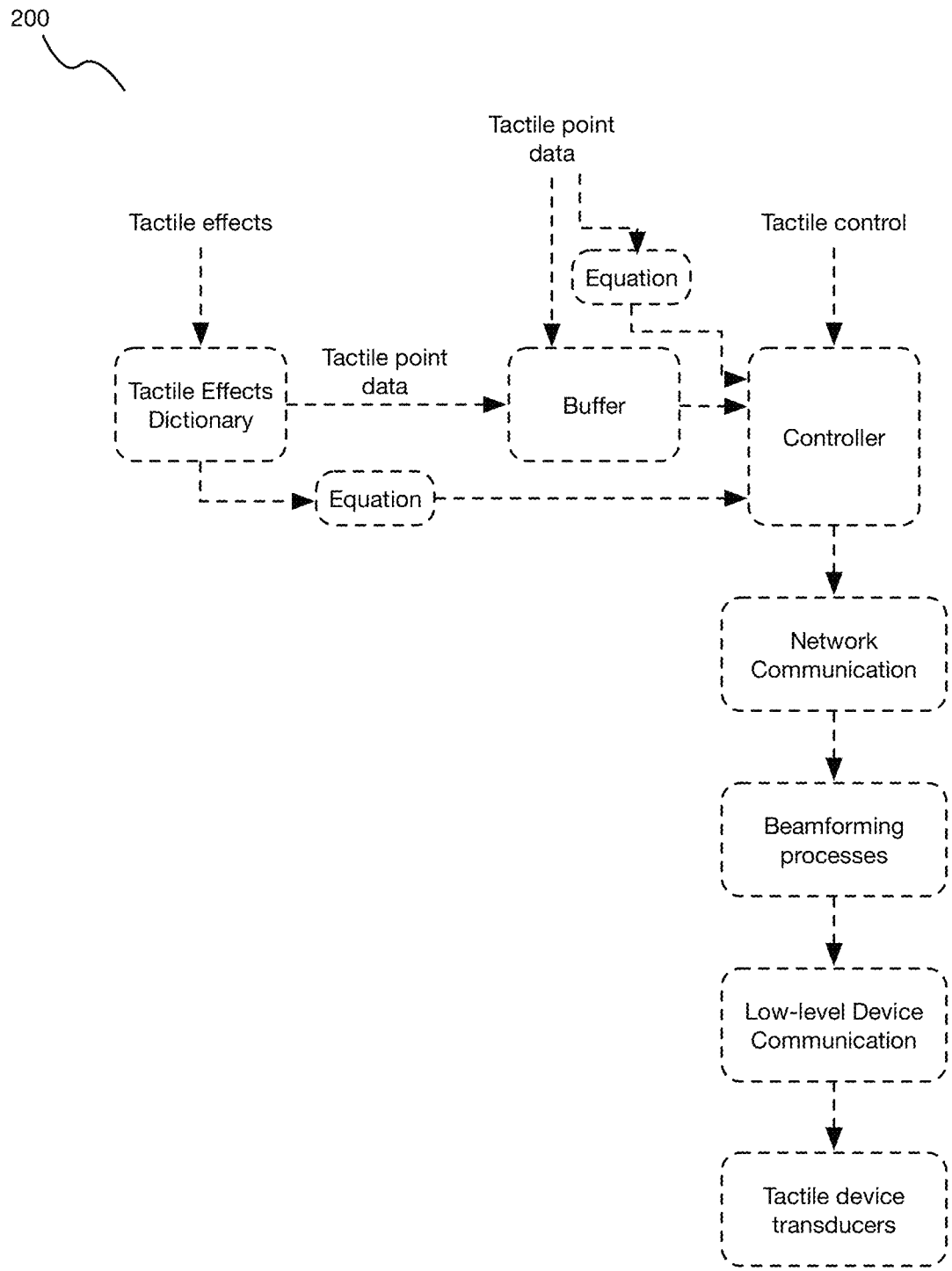
FIG. 9 depicts a variation of processing involved in a method for generating and managing tactile commands.

S230 can optionally include organizing and/or modifying any or all of the outputs (e.g., prior to transmitting as commands to the tactile device) with a buffer (e.g., as shown in FIG. 9), such as any or all of: ordering a set of tactile points and/or virtual contact points (e.g., in order of when to activate them); selecting a subset of tactile points and/or virtual contact points (e.g., only the virtual contact points in contact with a dominant hand of the user, only the virtual contact points associated with a hand of the user in contact with the highest number of virtual contact points, etc.); and/or otherwise modifying and/or organizing outputs. This can function to optimize the eventual tactile sensation for smoothness, maximal sensation, and/or any other properties which enhance the feel of the tactile sensation to the user.

In a first specific example, for instance, in determining in S220 that a set of virtual contact points (e.g., 4 virtual contact points) is to be portrayed to the user, the buffer (equivalently referred to herein as a tactile point set buffer) can determine an order in which the set of virtual contact points are provided as stimulation to the user, such as in a way to optimize for smoothness of the collective stimulation. Additionally or alternatively, the set of virtual contact points can be stimulated in parallel, in a different order to optimize for a different sensation, and/or be otherwise organized.

In a second specific example, in determining in S220 that there is a $1^{st}$ set of virtual contact points associated with a left hand of the user and $2^{nd}$ set of virtual contact points associated with a right hand of the user, the tactile point set buffer can select the $2^{nd}$ set of virtual contact point to be stimulated in an event that the right hand is the user's dominant and/or preferred hand. Alternatively, the buffer can select the $1^{st}$ set of virtual contact points to be stimulated in an event that the $1^{st}$ set has a greater number of virtual contact points than the $2^{nd}$ set. Alternatively, all virtual contact points can be stimulated.

S230 can include aggregating any or all of the set of outputs and/or commands (e.g., all sets of virtual contact points to be rendered), and sending them over (e.g., with a network protocol) to the tactile device. This is preferably performed with a controller, but can additionally or alternatively be performed with the tactile point set buffer and/or any other components.

In some variations (e.g., as shown in FIG. 9), a controller can aggregate, organize, manage, operate on, and/or communicate any or all of the information (e.g., tactile point data) being sent to the tactile device for stimulating the user. This effectively functions to play, pause, create, delete, combine (e.g., append, interleave, etc.), modify (e.g., translate, rotate, scale, etc.), and/or otherwise control the tactile stimulation provided to the user. In a first set of specific examples, for instance, the controller can initiate the provision of a tactile point set and/or set of virtual contact points and/or tactile effect, which can include, for instance, communicating the tactile information to the tactile device for optional processing (e.g., beamformer processing, post-processing, etc.) and activation at the tactile device (e.g., at the corresponding transducers). In a second set of specific examples, the controller can introduce new tactile point data to a set of tactile points and/or virtual contact points and/or tactile effects, such as a new tactile point data from a tactile point buffer (e.g., as described above). In a third set of specific examples, additional or alternative to those described above, the controller can transform tactile information, such as applying translation, rotation, and/or a scaling factor to the tactile information (e.g., tactile point sets, equations, tactile effects, etc.). In a fourth set of specific examples, additional or alternative to those described above, the controller can combine different types and/or sources of tactile data, such as combining tactile point data (e.g., virtual contact points) with equation data and/or a tactile effect assignment; combining tactile information from multiple virtual objects; and/or otherwise combining information.

Information is preferably communicated in S230 to the tactile device with a wireless connection (e.g., with a network protocol, with WiFi, with Bluetooth, with radio waves, etc.), but can additionally or alternatively be communicated with a wired connection, any combination, and/or otherwise suitably communicated. Further additionally or alternatively, any or all of the information can be generated onboard the tactile device.

Information can optionally additionally or alternatively be communicated from the tactile device to a computing subsystem (e.g., computing subsystem remote from the tactile device) and/or other component.

In specific examples, for instance, the tactile device communicates information indicating any or all of: receipt of a command, status of a command, any errors associated with a command, and/or any other information associated with commands and/or a status of the tactile device (e.g., sensor information, power status, etc.).

4.4 Method: Operating the Tactile Device Based on the Set of Tactile Commands S240

The method 200 can optionally include operating the tactile interface system based on the tactile commands and/or any other information, which functions to provide the tactile stimulation to the user.

S240 is preferably performed in response to and based on S230, and optionally multiple times (e.g., continuously, at a predetermined frequency, at a predetermined set of intervals, at random intervals, in response to a trigger, etc.) during operation of the tactile device, such as in response to each iteration of S230. Additionally or alternatively, S240 can be performed prior to any other process(es) of the method 200, in response to any other process(es) of the method 200, in parallel with any other process(es) of the method 200, and/or at any other times. Further additionally or alternatively, the method 200 can be performed in absence of S240.

S240 can optionally include performing one or more beamforming processes, which functions to determine a set of phase and/or amplitude values associated with transducers of the tactile device, wherein the set of phase and/or amplitude values are selected to provide tactile stimulation in accordance with the set of tactile commands. In some instances of this, for instance, the beamforming process determines phase and amplitude values of the transducers which produce a maximum and/or otherwise optimal sensation at the point in space corresponding to a virtual contact point. The beamforming process can be performed with any or all of: a one or more beamforming algorithms, a beamforming model (e.g., machine learning model, deep learning model, etc.), a set of rules, a lookup table and/or database, and/or any suitable tools.

In some variations, a processing and/or computing subsystem preferably onboard the tactile device but additionally or alternatively remote from the tactile device calculates data to control the tactile device from the tactile commands received from the tactile controller. In specific examples, the tactile device is an air-coupled ultrasound array that emits radiation pressure to induce tactile activation. To accomplish this, an acoustic field is created in the array field of emission, which is controlled by the phase and amplitude of the signals delivered to each transducer of the array. The phase values are preferably determined from the distance of each transducer to the location of the point activation and the acoustic wavelength, but can additionally or alternatively be otherwise determined.

Additionally or alternatively, any or all of the beamformer processing can be performed in S220.

S240 can optionally include providing any other content associated with an experience (e.g., VR experience, AR experience, etc.) of the user, such as providing visual content (e.g., showing how the digital object moves, showing how the digital object changes as the user "touches" it, etc.), audio content, and/or any other content.

In a first variation, the tactile commands are preferably sent to a processing system associated with the tactile device (e.g., arranged onboard the tactile interface device, in communication with the tactile interface device, etc.), wherein the tactile commands are used (e.g., at back-end software) to determine the signals associated with producing the tactile sensations (e.g., the operation of transducers in a phased array to produce localized points of acoustic radiation pressure through beamforming). In some variations, for instance, the tactile commands communicated are further processed through back-end software of the tactile interface system to produce and update tactile sensations at a transducer array. Additionally or alternatively, tactile commands can be otherwise used to determine and/or provide tactile sensation.

Additionally or alternatively, any other tactile stimulation can be applied at the tactile device in any suitable way.

4.5 Method: Repeating any or all of the Above Processes

The method 200 can include repeating any or all of the above processes in any suitable order, which can function to perform any or all of: modifying an interaction based on a user action (e.g., the user moving, the user gesturing, etc.); modifying an interaction based on a digital object moving and/or changing; triggering a tactile effect (e.g., based on temporal triggers, based on spatial triggers, based on interactions, etc.); and/or any can perform any other functions.

In some variations, any or all of the processes of the method are performed continuously and/or a predetermined frequency (e.g., every second, every millisecond, every 5 milliseconds, every 10 milliseconds, every 100 milliseconds, between every millisecond and every second, greater than every second, less than every second, etc.). Additionally or alternatively, any or all of the processes can be performed in response to a trigger and/or at any other suitable time(s).

5. Variations

Figure 5:
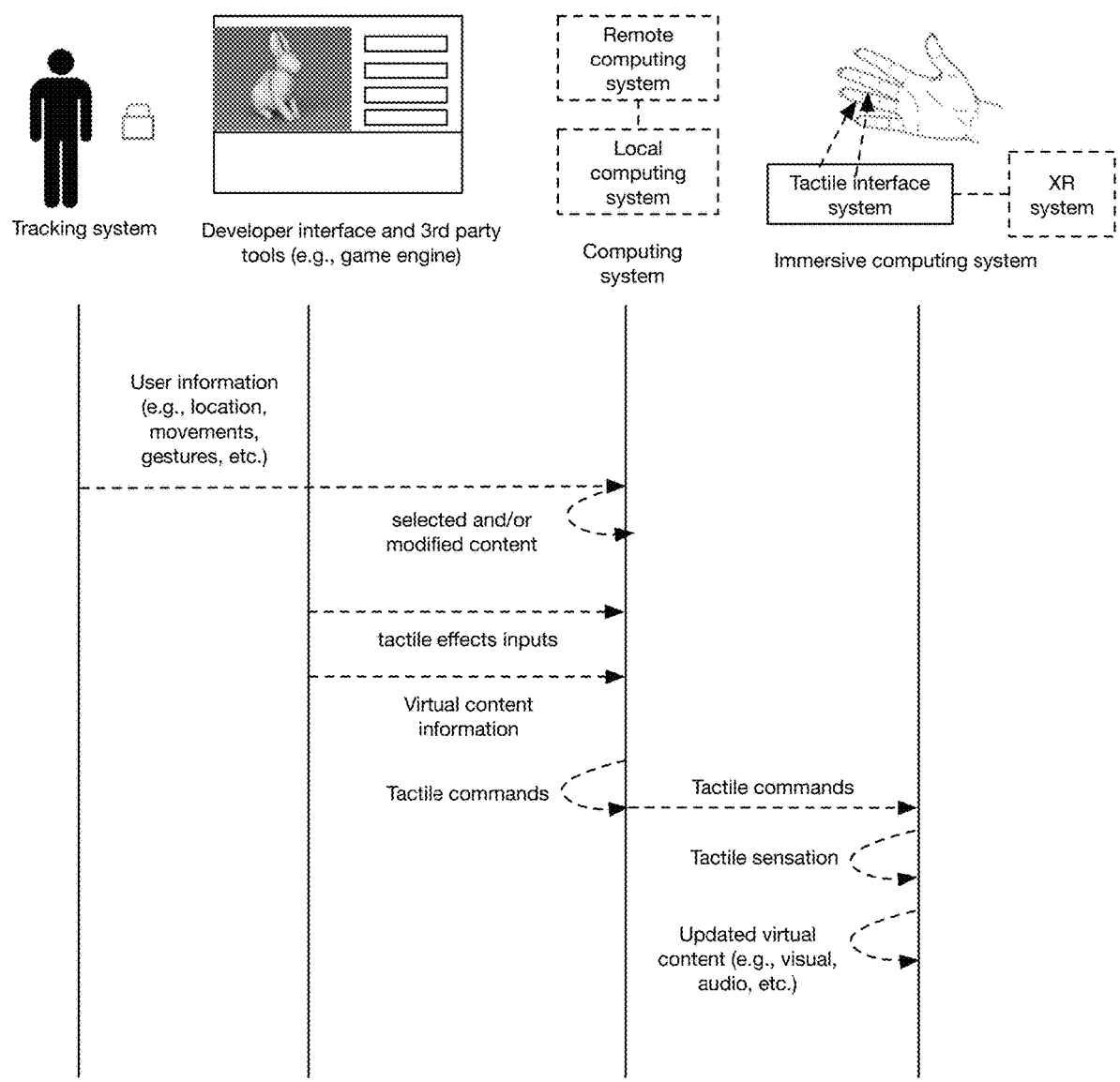
FIG. 5 depicts information flows among components of a variation of a system for generating and managing tactile commands.
Figure 6A:
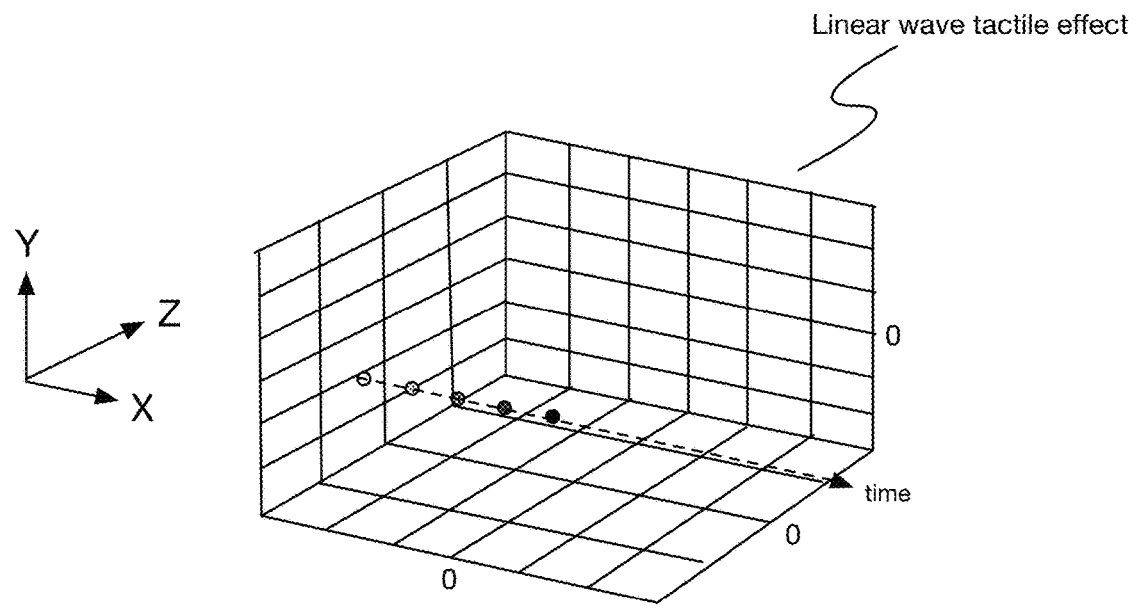
FIGS. 6A-6F depict examples of tactile effects, which can be received from developers at a developer interface in variations of the system and method.
Figure 6B:
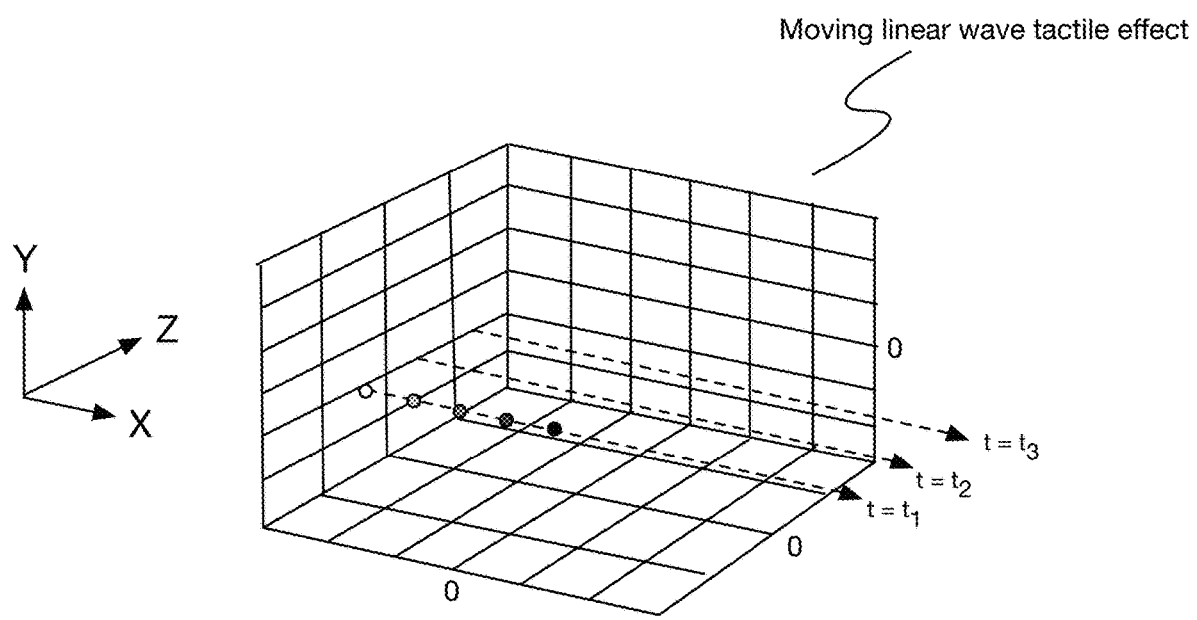
Figure 6C:
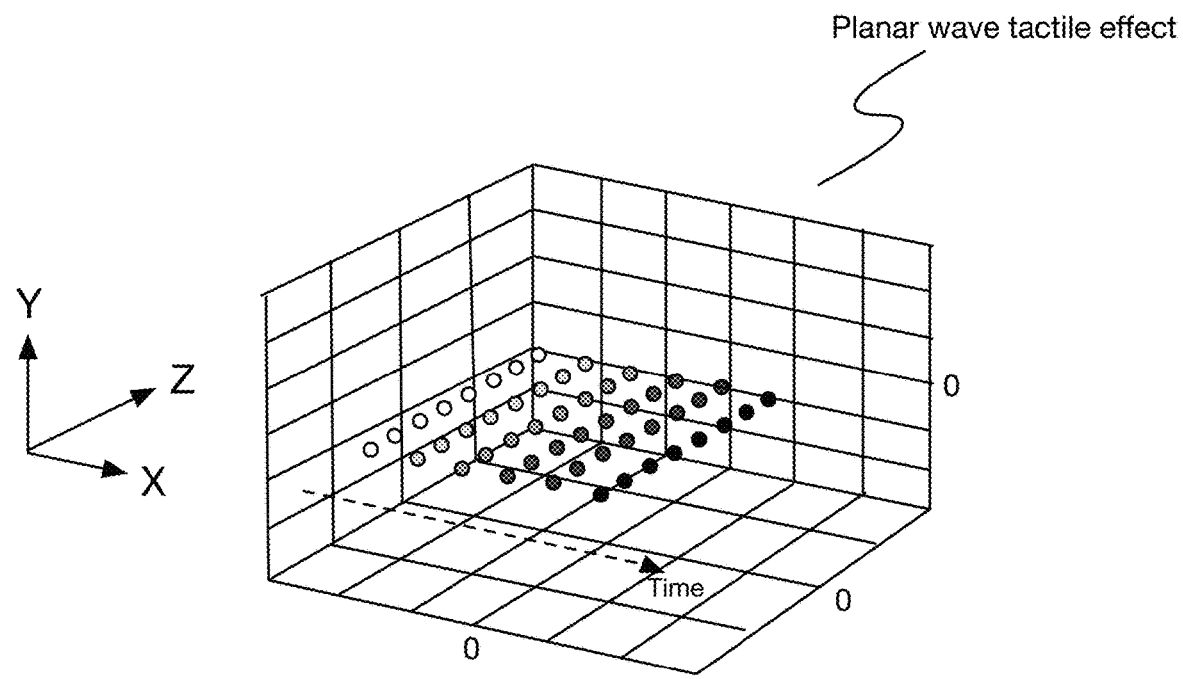
Figure 6D:
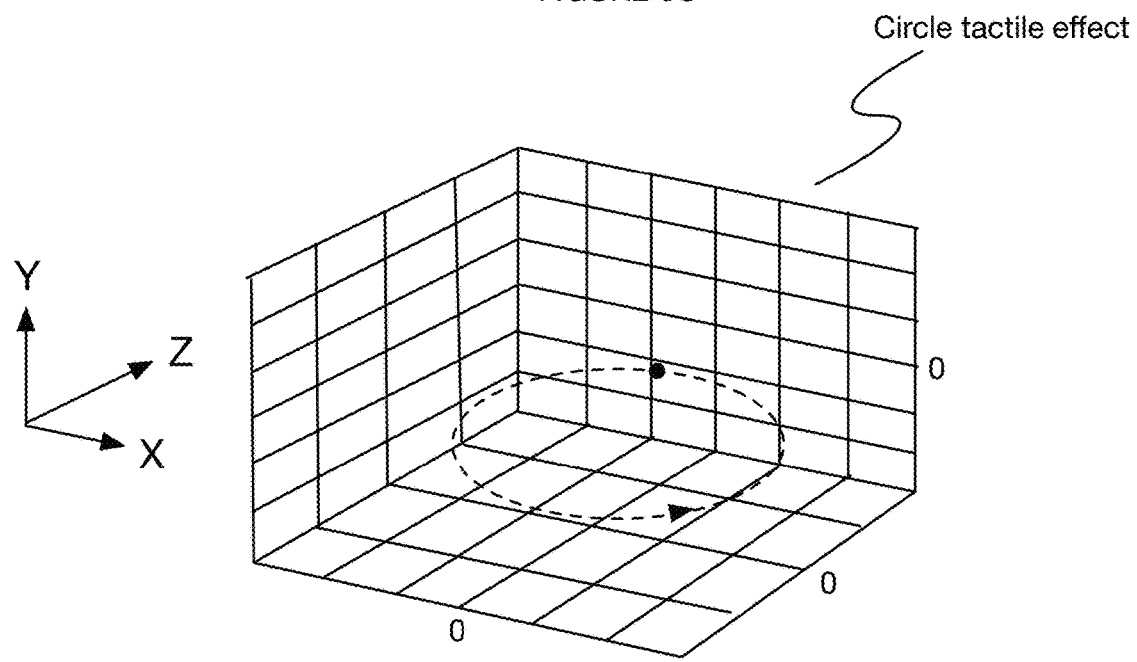
Figure 6E:
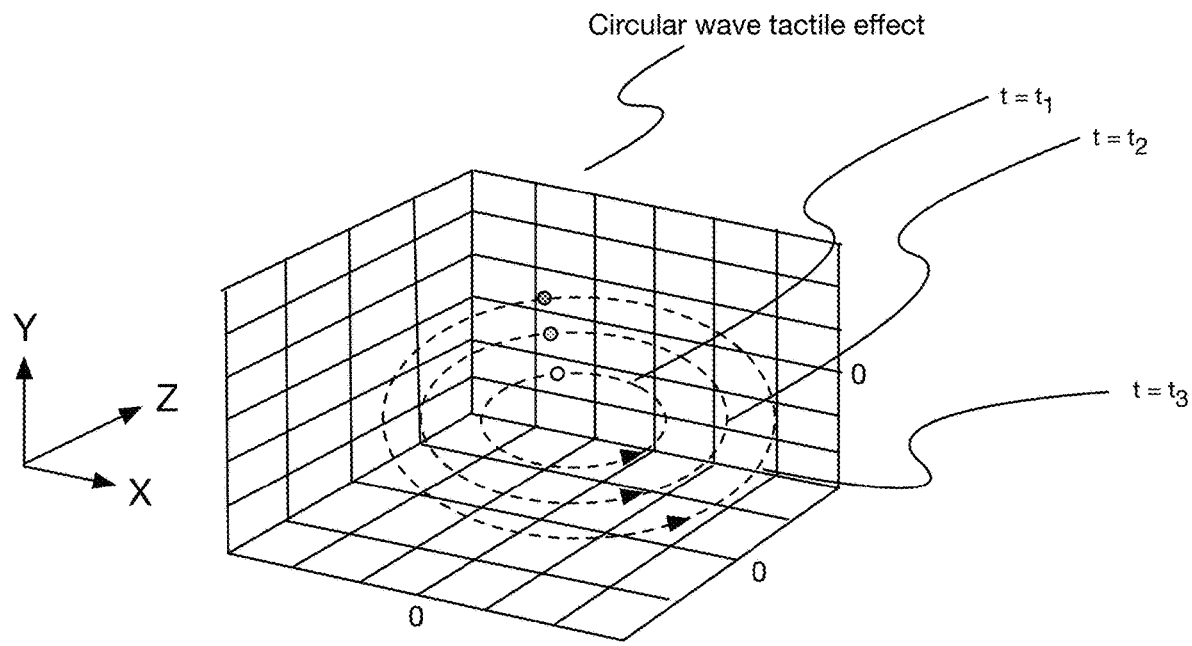
Figure 6F:
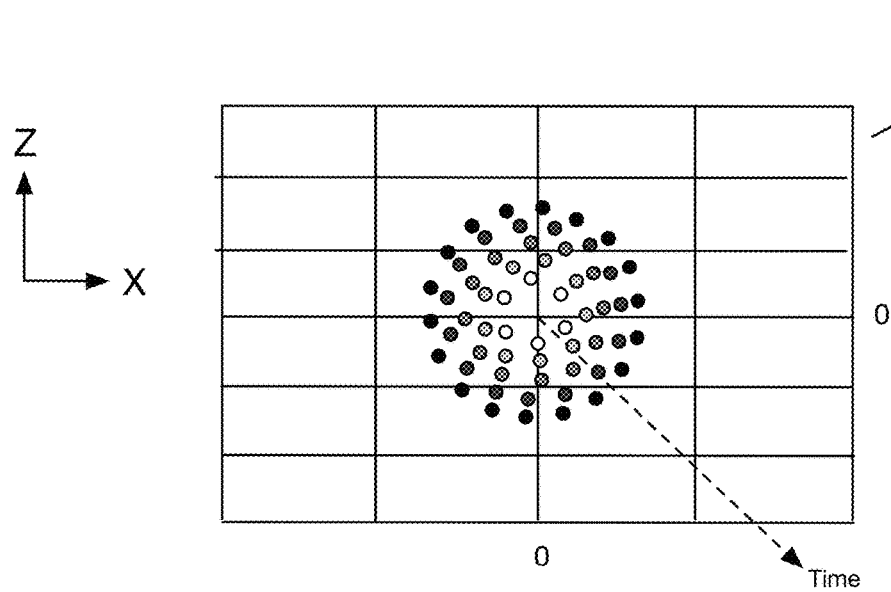

In a variation of the method 200 (e.g., as shown in FIG. 2, as shown in FIG. 5), the method includes any or all of: receiving user information from one or more tracking systems associated with the user (e.g., camera tracking system coupled to a tactile interface system, camera tracking system of XR system, motion/orientation sensors of XR system headset, etc.), wherein the user information can include user actions, user locations, user gestures, user movements, and/or any other suitable information (e.g., information related to user input via a human machine interface); receiving tactile effects selections from a developer at a developer interface associated with a $3^{rd}$ party tool (e.g., Unity game engine), wherein the tactile effects selections are optionally assigned to one or more virtual objects in the XR system (additionally or alternatively, tactile effects selections can be independent of virtual objects, such as an effect representing blowing wind); receiving content information associated with the XR system (e.g., the virtual objects); processing the set of inputs according to a set of tactile modes (e.g., tactile points mode, tactile mesh mode, and tactile effects mode), wherein processing the set of inputs produces a set of tactile commands prescribing the high level tactile sensation to be applied to the user at the tactile interface system; communicating the tactile commands to the tactile interface system (e.g., for further processing); optionally operating the tactile interface system based on the tactile commands; and optionally updating the tactile commands (e.g., based on an updated set of inputs) and/or virtual content. The method 200 can additionally or alternatively include any other suitable processes performed in any suitable order.

In another variation, additional or alternative to the first, the method 200 includes receiving a set of inputs, wherein the set of inputs includes any or all of: a set of digital objects associated with an experience of the user, a set of tactile effects, user location information from a tracking subsystem, and/or any other inputs; processing the set of inputs, wherein the processing the set of inputs can include any or all of: modeling the set of digital objects (e.g., if not already modeled, to create a set of mesh vertices, to assign a set of tactile points to the vertices, etc.), determining a set of tactile points associated with the digital objects, determining a set of tactile points associated with a tactile effects, determining an equation (e.g., parametric equation) associated with the digital objects, determining an equation associated with the tactile effects, determining a set of virtual contact points based on the tactile information and the user location(s), and/or any other processes; modifying any or all of the tactile information (e.g., combining different types of tactile information, rotating and/or scaling and/or translating tactile information, etc.); determining and communicating a set of tactile commands to the tactile device based on the tactile information; determining parameters (e.g., phase, amplitude, etc.) for a set of transducers based on the tactile commands (e.g., based on a beamforming process); and operating the set of transducers based on the parameters. Additionally or alternatively, the method 200 can include any other processes.

Figure 8:
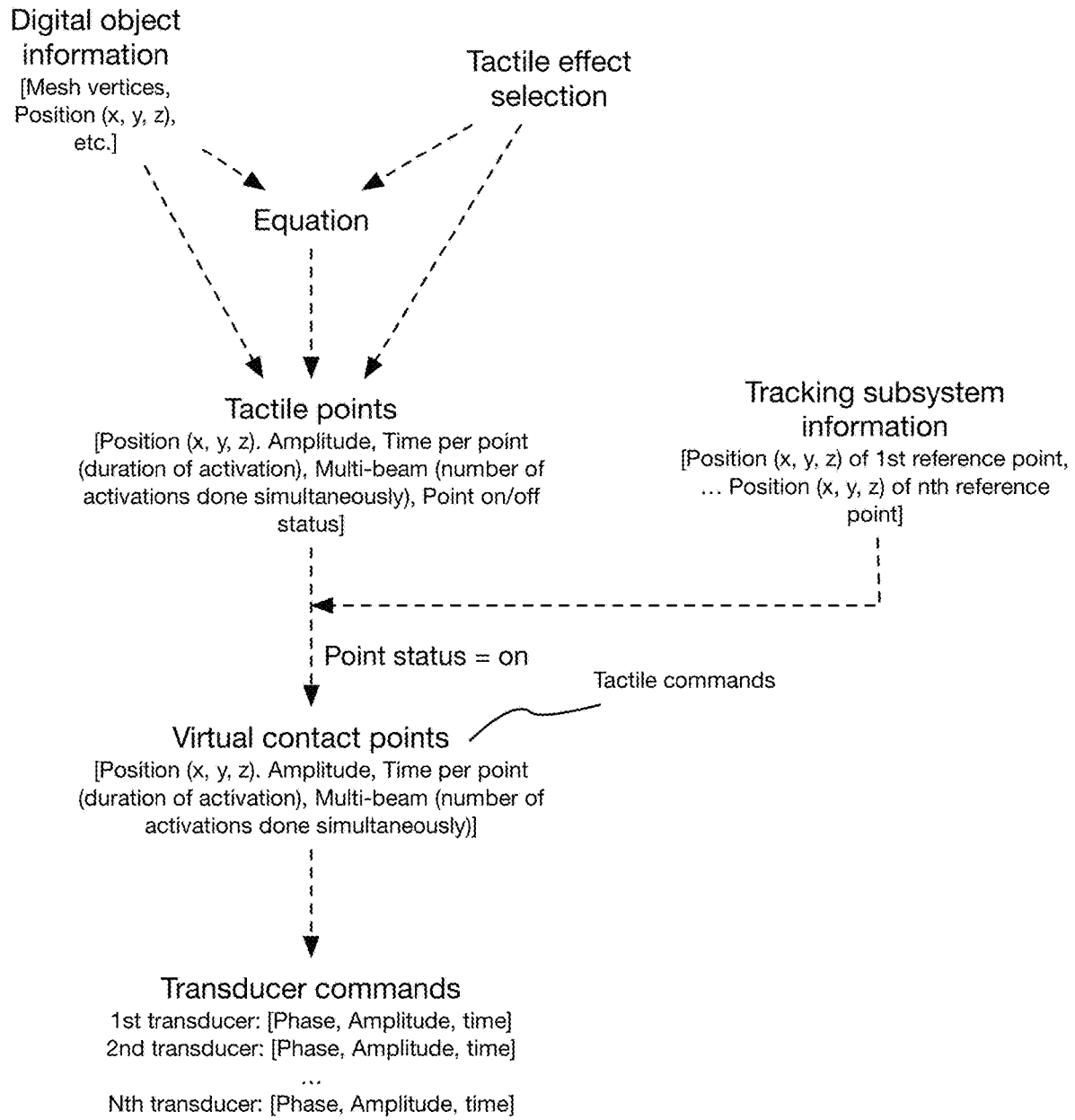
FIG. 8 depicts a variation of tactile information involved in a method for generating and managing tactile information.

In a first specific example of the method 200, any or all of the information shown in FIG. 8 can be used in determining transducer commands to be provided at the tactile device.

In a second specific example of the method 200 shown in FIGS. 10A-10C, the user sees a digital rabbit at a display of an XR system (e.g., at a VR headset of the user, at a display, etc.) and reaches out with his or her hand in the direction of the digital rabbit; based on a mesh of the digital object (e.g., as shown in FIG. 10B), detecting contact between a set of reference points arranged at fingertips of the user's hand and the tactile point set (defined at the vertices of the mesh) to determine $1^{st}$ and $2^{nd}$ virtual contact points at which the reference points contact (e.g., overlap, touch, are within a predetermined distance of, etc.) tactile points of the tactile point set; determining (e.g., with a beamforming algorithm and/or model) parameters (e.g., phase and amplitude values) of a set of one or more transducers with which to create tactile sensation at the $1^{st}$ virtual contact point; determining (e.g., with a beamforming algorithm and/or model) parameters (e.g., phase and amplitude values) of a set of one or more transducers with which to create tactile sensation at the $2^{nd}$ virtual contact point; and operating the transducers based on the sets of parameters.

Additionally or alternatively, the method 200 can include any other processes performed in any suitable order.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A system for generating tactile sensation with a stimulation device, the system comprising:
   the stimulation device comprising a set of ultrasonic transducers;
   a processing subsystem in communication with the stimulation device and a tracking subsystem, wherein the processing subsystem:
      receives a first set of inputs, wherein the first set of inputs comprises a first set of locations associated with virtual content, the virtual content comprising moving virtual content, wherein the first set of locations is associated with a set of meshes defining at least a portion of the virtual content;
      receives a second set of inputs from the tracking subsystem, wherein the second set of inputs comprises a second set of locations associated with the user;
      determines a set of virtual contact regions between the virtual content and the user based on the first and second sets of locations; and
      scales the mesh to optimize a size of the virtual content relative to an interaction volume of the stimulation device; and
   a control subsystem in communication with the processing subsystem, wherein the control subsystem operates the set of ultrasonic transducers to produce mid-air ultrasonic stimulation based on the set of virtual contact regions.

2. The system of claim 1, wherein the virtual content comprises a set of digital objects associated with an immersive environment.

3. The system of claim 1, wherein the second set of locations is further associated with a hand of the user.

4. The system of claim 1, wherein the set of virtual contact regions comprises a set of virtual contact points.

5. The system of claim 4, wherein the set of virtual contact regions is determined based on a set of proximity metrics, the set of proximity metrics determined based on comparing the first set of locations with the second set of locations.

6. The system of claim 5, wherein the set of proximity metrics comprises an overlap metric.

7. The system of claim 1, wherein the first set of locations is associated with a set of surfaces, wherein the set of surfaces defines at least a portion of the virtual content.

8. The system of claim 7, wherein the set of meshes define the set of surfaces.

9. A method for generating tactile sensation with a stimulation device, the method comprising:
   receiving a first set of inputs associated with a set of moving digital objects;
   scaling the set of moving digital objects to optimize a size of the set of moving digital objects relative to an interaction volume of the stimulation device;

receiving a second set of inputs from a tracking subsystem, wherein the second set of inputs comprises a second set of locations associated with a user;

defining a set of virtual contact regions between the set of moving digital objects and the user based on the first and second sets of locations; and operating a set of ultrasonic transducers of the stimulation device to produce mid-air ultrasonic stimulation based on the set of virtual contact regions.

10. The method of claim 9, wherein the stimulation device is configured to produce ultrasonic stimulation.

11. The method of claim 10, wherein the ultrasonic stimulation comprises mid-air ultrasonic stimulation.

12. The method of claim 9, wherein the first set of inputs is received from a third party subsystem.

13. The method of claim 9, wherein the set of virtual contact regions is determined based on a set of proximity metrics, the set of proximity metrics determined based on comparing the first set of locations with the second set of locations.

14. The method of claim 13, wherein the set of proximity metrics comprises an overlap metric.

15. The method of claim 13, wherein the set of virtual contact regions comprises a set of virtual contact points.

16. The method of claim 9, further comprising determining a set of stimulation parameters based on the set of virtual contact regions.

17. The method of claim 16, wherein the set of stimulation parameters comprises a selection of a subset of the set of transducers.

18. The method of claim 17, wherein the set of stimulation parameters further comprises at least one of: a set of amplitudes associated with the subset of transducers, a set of frequencies associated with the subset of transducers, and a set of phase values associated with the subset of transducers.

19. The method of claim 9, further comprising:

receiving an updated set of inputs associated with the set of moving digital objects;

receiving an updated set of inputs comprising an updated set of locations associated with the user from the tracking subsystem;

adjusting the set of virtual contact regions based on the updated sets of locations; and operating the set of ultrasonic transducers of the stimulation device to produce mid-air ultrasonic stimulation based on the adjusted set of virtual contact regions.

20. The method of claim 9, wherein scaling the set of moving digital objects comprises scaling a mesh defining the set of moving digital objects.

* * * * *